US007559621B2

United States Patent
Takatsuka et al.

(10) Patent No.: US 7,559,621 B2
(45) Date of Patent: *Jul. 14, 2009

(54) INKJET RECORDING APPARATUS

(75) Inventors: Tsutomu Takatsuka, Kanagawa (JP);
Toshiya Kojima, Kanagawa (JP);
Tadahisa Sato, Minami-Ashigara (JP);
Hideki Maeta, Minami-Ashigara (JP);
Yuki Shimizu, Minami-Ashigara (JP)

(73) Assignee: Fujifilm Corporation, Tokyo (JP)

( * ) Notice: Subject to any disclaimer, the term of this patent is extended or adjusted under 35 U.S.C. 154(b) by 469 days.

This patent is subject to a terminal disclaimer.

(21) Appl. No.: 11/365,864

(22) Filed: Mar. 2, 2006

(65) Prior Publication Data
US 2006/0197795 A1 Sep. 7, 2006

(30) Foreign Application Priority Data
Mar. 4, 2005 (JP) ............................. 2005-060739

(51) Int. Cl.
*B41J 2/165* (2006.01)
(52) U.S. Cl. .............................. 347/23; 347/29; 347/95
(58) Field of Classification Search ................. 347/100, 347/95, 96, 101, 15, 20, 8, 9, 23, 29
See application file for complete search history.

(56) References Cited
U.S. PATENT DOCUMENTS
6,582,508 B2   6/2003   Dietz et al.
7,240,983 B2 *  7/2007   Kojima .......................... 347/23
2005/0062792 A1   3/2005   Kojima
2005/0109240 A1   5/2005   Maeta et al.

FOREIGN PATENT DOCUMENTS
JP   11-192729 A   7/1999
JP   2002-14622 A   5/2002

* cited by examiner

*Primary Examiner*—Manish S Shah
(74) *Attorney, Agent, or Firm*—Birch, Stewart, Kolasch & Birch, LLP

(57) ABSTRACT

The inkjet recording apparatus includes: a recording head including nozzles which discharge droplets of ink onto a recording medium for printing, the ink containing fine particles of an organic pigment manufactured by the steps of: flowing a solution of an organic pigment dissolved in an alkaline or acidic aqueous medium through a channel which provides a laminar flow; and changing a hydrogen ion exponent (pH) of the solution in a course of the laminar flow; a computing device which computes a non-operational time period for one of the nozzles; a calculating device which calculates a predicted non-operational time period until a next operation of the one of the nozzles; and a preliminary discharge control device which performs control whereby preliminary discharge of the one of the nozzles is carried out if a total of the non-operational time period and the predicted non-operational time period exceeds a reference time period.

7 Claims, 18 Drawing Sheets

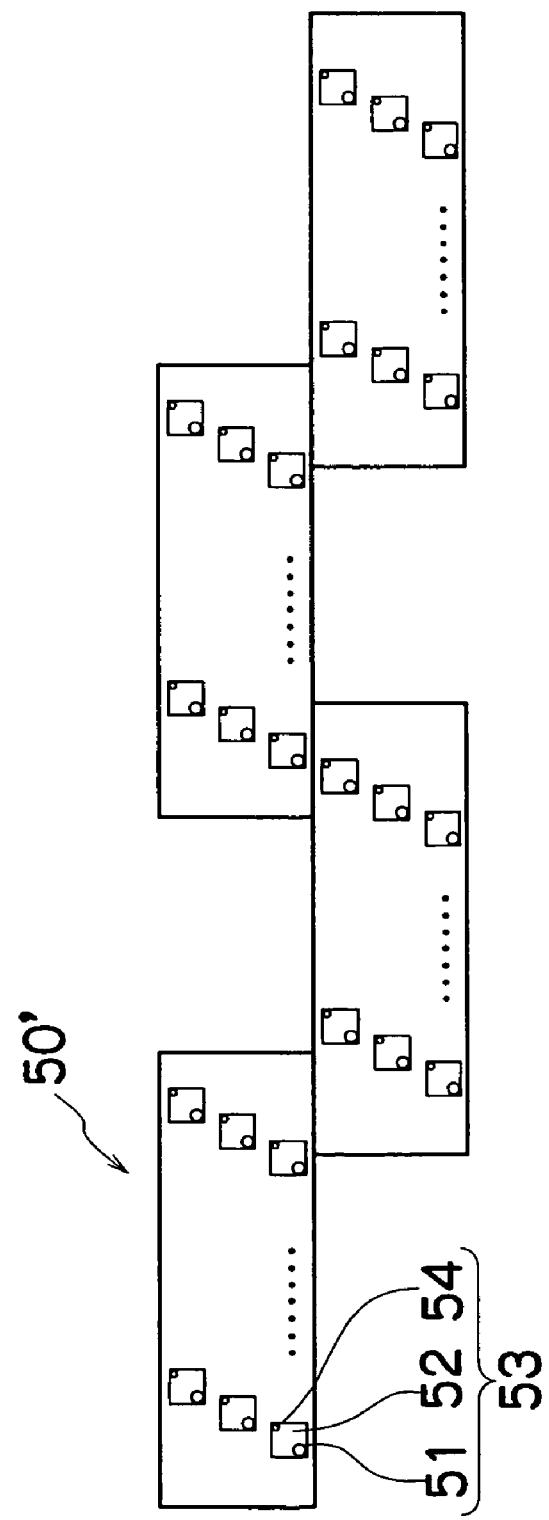

INKJET RECORDING APPARATUS

BACKGROUND OF THE INVENTION

1. Field of the Invention

The present invention relates to an inkjet recording apparatus, and in particular, to technology for controlling a recovery operation of a recording head ejecting pigment ink.

2. Description of the Related Art

Recently, inkjet recording apparatuses (inkjet printers) have become common as recording apparatuses for printing and recording images captured by digital still cameras, and the like. An inkjet recording apparatus comprises a plurality of recording elements in a head, the recording head being moved to scan a recording medium while droplets of ink are discharged onto the recording medium from the recording elements, and each time one line of an image is recorded onto recording paper, the recording medium is conveyed through a distance corresponding to one line, this process being repeated, whereby an image is formed onto the recording paper.

Inkjet printers include those which use a short-length serial head, and carry out recording by causing the head to scan in the lateral direction of a recording medium, and those which use a line head in which recording elements are aligned up to a dimension corresponding to the full width of one edge of the recording medium. In a printer using a line head, it is possible to carry out image recording across the full surface of the recording medium, by scanning the recording medium in an orthogonal direction to the direction in which the recording elements are arranged. In a printer using a line head, it is not necessary to provide a conveyance system, such as a carriage, or the like, for causing a short-dimension head to scan, and furthermore, movement of the carriage and complex scanning control of the recording medium also becomes unnecessary. Furthermore, since only the recording medium is moved, it is possible to achieve higher recording speeds in comparison to printers using serial heads.

Inks used in inkjet printers have a characteristic in that when they come into contact with the atmosphere, the ink solvent (principally water in the case of water-based inks, for example), evaporates, and the viscosity of the ink increases gradually as time passes, until eventually, it solidifies. Therefore, at nozzles which have not discharged ink for a long period of time, firstly, the ink in the peripheral region of the nozzle opening (the surface where the ink comes into contact with the air) becomes highly viscose, and gradually, the ink inside the nozzle also increases in viscosity.

If increased viscosity of the ink occurs as described above, then the ink becomes less liable to be discharged from a nozzle which has not discharged ink for a long period of time, and furthermore, a problem arises in that as time passes, it will become impossible to discharge the ink, even if the prescribed pressure is applied.

In order to resolve problems of this kind, preliminary discharge (purge, liquid discharge, air discharge, dummy discharge) is carried out at prescribed time intervals, and a recovery operation is implemented whereby the ink of increased viscosity inside the nozzles is discharged externally, or hardened ink is sucked in by means of a suctioning device, such as a pump.

In the inkjet recording apparatus, recovery processing method and storage medium storing a recovering processing program disclosed in Japanese Patent Application Publication No. 11-192729, the nozzles used in printing the same content are established, and therefore, it is not necessary to perform recovery operation during printing, and control is performed in such a manner that a recovery operation is not carried out during recording, if a plurality of prints of the same content are being made. If, on the other hand, the print contents are different, then the time that each nozzle is left unused is recorded, and if it is equal to or below a reference time, then control is implemented in such a manner that a recovery operation is not carried out for that nozzle. By performing control in this way, the number of preliminary discharge operations is reduced and the amount of ink consumed is also reduced.

On the other hand, inks to be used in inkjet printers are roughly classified into dye-based inks and pigment-based inks. As the coloring material for ink-jet ink, dyes have been used, but they have drawbacks as to water resistance and light resistance. To overcome the drawbacks, pigments have come to be used. Images obtained from pigment inks have remarkable advantages of superior light resistance and water resistance compared with images obtained from dye-based inks. However, there are problems that the pigment is not easily formed uniformly or pulverized into fine-particles of a nanometer size (i.e., monodispersion), which can permeate pores in the surface of paper, and it is then difficult to form images with high saturation because the pigment is poor in permeability into the paper.

As measures to solve the above-described problems, Japanese Patent Application Publication No. 2002-146222 discloses a method to produce fine particles of pigment using a microjet reactor method. This is a method of introducing a solution, in which a pigment is dissolved, and a precipitation medium solution, into two nozzles that are opposite to each other and that have different micrometer sizes, at high pressure (for example, 5 MPa) by means of pumps; and introducing a gas (such as compressed air) perpendicularly into a portion where the jet flows of the two solutions collide with each other, so as to discharge a suspension of the pigment by the gas flow (flow rate, about 0.5 m$^3$/h).

If a recovery operation is carried out frequently in order to prevent discharge errors or discharge failures, then not only does this increase the amount of ink consumed, but furthermore, it also causes the productivity of the actual printing process to fall. Moreover, since a recovery device for performing a recovery operation includes consumables parts, such as a blade, or the like, then it is necessary to carry out maintenance of these consumable parts.

However, it is difficult to solve the problems concerning the discharge errors and the discharge failures with the measures disclosed in Japanese Patent Application Publication No. 11-192729. In particular, when the pigment ink containing the pigment particles of large particle size and poor monodispersion is used, it is difficult to form images with high saturation, and moreover, the discharge errors and the discharge failures may be aggravated.

In the inkjet recording apparatus, the recovery processing method and the storage medium storing a recovery processing program disclosed in Japanese Patent Application Publication No. 11-192729, even in the case of prints of the same content, if a large volume of prints are made at any one time, then any nozzles not used in that print will be unused for a long period of time, and hence the ink inside the nozzles may solidify completely (the viscosity thereof may become extremely high or the viscosity may increase from the nozzle opening section and through to the deeper regions of the nozzle), and it may not be possible to recover the nozzle simply by performing preliminary discharge. Considering the case of a print having long dimensions, if the time out of use is checked before printing, then increase in the viscosity of the ink will occur during printing, and the reference time period until discharge errors arise may be exceeded.

Consequently, discharge errors or discharge failures may occur at the nozzles, and hence, in the print result, streaking may arise in the direction of conveyance of the recorded medium. The aforementioned problem is particularly noticeable in the case of single-pass printing using a line head.

In the method for producing fine particles of pigment disclosed in Japanese Patent Application Publication No. 2002-146222, particles are generated in a very small space, of a micrometer scale, and the particles are immediately taken out from the apparatus, thereby preventing the apparatus from being blocked by the pigment fine-particles. This method is then preferred to obtain fine particles having a narrow particle size distribution. However, the method has such problems as that the contact time for the two solutions is not easily controlled, and thus subtle reaction control is difficult. Therefore, it is difficult to stably produce fine particles of pigment of sufficient monodispersion.

In the related art as described above, there are unsolved problems of recovery of the discharge errors and the discharge failures and production of fine particles of pigment, and it is hence difficult to obtain images of high resolution and high saturation by means of the pigment ink.

SUMMARY OF THE INVENTION

The present invention has been contrived in view of such circumstances, and an object thereof is to provide an inkjet recording apparatus whereby pigment ink containing pigment particles of fine particle size and excellent monodispersion can be ejected from the recording head, and the amount of ink consumed in the recovery operation can be reduced, so that it is possible to obtain images of high resolution and high saturation by means of the pigment ink and also to prevent discharge errors and discharge failures from occurring.

In order to attain the above-described object, the present invention is directed to an inkjet recording apparatus, comprising: a recording head including nozzles which discharge droplets of ink onto a recording medium for printing, the ink containing fine particles of an organic pigment manufactured by the steps of: flowing a solution of an organic pigment dissolved in an alkaline or acidic aqueous medium through a channel which provides a laminar flow; and changing a hydrogen ion exponent (pH) of the solution in a course of the laminar flow; a computing device which computes a non-operational time period for one of the nozzles; a calculating device which calculates a predicted non-operational time period until a next operation of the one of the nozzles; and a preliminary discharge control device which performs control whereby preliminary discharge of the one of the nozzles is carried out if a total of the non-operational time period and the predicted non-operational time period exceeds a reference time period.

The inventors, having eagerly investigated to solve the above-mentioned problems in the related art, have found out that, when a solution containing a reaction component is caused to flow into a channel, to synthesize a target organic pigment, the organic pigment, of high purity, can be rapidly obtained under a mild condition. Further, the inventors have found out that, by carrying out a co-precipitation method (re-precipitation method) to a solution of an organic pigment, under the effect of pH change, in a channel in which a laminar flow is preferential (predominant), organic pigment fine-particles having evener particle sizes can be obtained, compared with when a method in the related art, as performed in a flask, is carried out.

According to the present invention, the pigment ink containing the organic pigment fine particles having excellent monodispersion is ejected from the recording head, so that the permeability of the coloring material into the paper is improved, the deposition interference is prevented, and images of high resolution and high saturation are hence obtainable. Moreover, the block of the nozzles in the recording head is prevented significantly in comparison with the pigment ink in the related art.

In particular, when the pigment ink containing the organic pigment fine particles having excellent monodispersion is used in the image forming apparatus utilizing aggregation reaction in two types of liquid, in which the ink containing the pigment-based coloring material and a treatment liquid making the pigment particles to aggregate are deposited and/or applied, then the pigment particles are instantaneously made to aggregate and deposited on the recording medium, and the shapes of dots formed by the pigment particles are not deformed even if the solvents in the ink droplets mix and combine together. Thus, the deposition interference is significantly prevented.

More specifically, control is performed whereby preliminary discharge is carried out, if the total time period of the non-operational time period (past portion) from the previous operation of the nozzle, plus the predicted time period from the current time until the next time that the nozzle is to be operated, exceeds a reference time period. Therefore, it is possible to prevent the occurrence of discharge abnormalities in the nozzles, during the course of printing.

Operation of the nozzle also includes, in addition to discharge of the ink during printing, recovery operations, such as preliminary discharge, nozzle suctioning, and the like.

If the ink is expelled (discharged) from a nozzle due to the operation of the nozzle, preliminary discharge thereof, suctioning, or the like, then the calculated non-operational time period is reset (initialized), and a new non-operational time period is measured after the reset.

The interval time period between images and the time period required for margin regions may also be included in the non-operational time period.

The timing at which a judgment is made regarding whether or not preliminary discharge is to be carried out may be when printing of each image starts, or it may be when printing of each batch (printing job) starts. Moreover, if the judgment is made on a batch-by-batch basis, then in the case of a batch that takes a long time, it is possible to implement control in such a manner that the judgment is made for each image in the batches, or at any desired timing, or the like.

The recording head may be a full line type print head wherein ink discharge ports (nozzle opening) are disposed along the entire printable region of the recording medium which is to be printed, in a direction substantially orthogonal to the direction of conveyance of the recording medium, or it may be a divided type head wherein a line type print head is divided up into a plurality of heads. Furthermore, it is also possible to use a shuttle scan type print head wherein a short-dimension print head causes ink droplets to be discharged, while moving in a direction substantially orthogonal to the conveyance direction of the print medium. A combination of a line type head and a shuttle scan type head may also be used.

During printing, or during standby, if the use frequency of a particular nozzle is low, and if it continues in a state of not discharging ink for a prescribed time period or more, then the solvent in the ink in the vicinity of the nozzle evaporates and the viscosity of the ink increases. In a situation of this kind, it will become impossible to discharge ink from the nozzle, even if the actuator is operated.

Preliminary discharge (purging, "spit" discharge, blank discharge, dummy discharge) is a discharge of the ink inside a nozzle, which is carried out before a situation of this kind develops (while the ink is of a viscosity that allows discharged by means of operation of the actuator), by operating the actuator and expelling the degraded ink (the ink in the vicinity of the nozzle having increased viscosity), and it may be carried out whenever the power supply is switched on (or reset), and at prescribed time intervals, or it may be carried out as and when necessary, by detecting the results of droplet ejection.

The reference time period may be set for each nozzle, or it may be set for each plurality of nozzles. Moreover, it may also be set for the whole recording head. Furthermore, if a plurality of recording heads are provided, then it may be set individually for each recording head, or it may be set universally for all of the heads.

According to the present invention, the pigment ink containing the organic pigment fine particles having excellent monodispersion is ejected from the recording head, and the discharge errors and discharge failures are prevented, so that it is possible to obtain images of high resolution and high saturation by means of the pigment ink.

In the present specification, the term "printing" indicates the concept of forming images in a broad sense, including text, and not simply the formation of text.

Moreover, in order to attain the above-described object, the present invention is also directed to an inkjet recording apparatus, comprising: a recording head including nozzles which discharge droplets of ink onto a recording medium for printing, the ink containing fine particles of an organic pigment manufactured by the steps of: flowing a solution of an organic pigment dissolved in an alkaline or acidic aqueous medium through a channel which provides a laminar flow; and changing a hydrogen ion exponent (pH) of the solution in a course of the laminar flow; a computing device which computes a non-operational time period for the nozzles; a calculating device which calculates a predicted non-operational time period until a next operation of the nozzles; and a preliminary discharge control device which performs control whereby: in one of the nozzles to be operated in a next image, preliminary discharge of the nozzle is carried out if a total of the non-operational time period and the predicted non-operational time period exceeds a first reference time period; and in one of the nozzles not to be operated in the next image, a prescribed time period is set as the predicted non-operational time period, and preliminary discharge of the nozzle is carried out if a total of the non-operational time period and the prescribed time period exceeds a second reference time period.

More specifically, it is judged whether or not to carry out preliminary discharge on the basis of the first reference time period, in the case of a nozzle that is to be operated, and on the basis of the second reference time period, in the case of a nozzle that is not to be operated. The necessity of preliminary discharge can be judged according to whether or not a nozzle is to be operated, and hence the amount of ink consumed in preliminary discharge can be reduced.

If two reference time periods are used, in such a manner that the first reference time period is shorter than the second reference time period, then it is possible to reduce the number of preliminary discharge operations in nozzles that are not to be operated, in comparison with nozzles which are to be operated.

The first reference time period and the second reference time period may be set respectively for each nozzle, or they may be set for each plurality of nozzles. Moreover, they may also be set for the whole recording head. Furthermore, if a plurality of recording heads are provided, then they may be set individually for each recording head, or they may be set universally for all of the heads.

Since the predicted non-operational time cannot be calculated in a nozzle that is not to be operated, a prescribed time period (value) is set instead of a predicted non-operational time. This prescribed time period may be zero, or it may be a value determined by prescribed calculation. The mode for determining the prescribed time period may be based on the average value of the non-operational times in the past, or it may be based on a predicted value obtained by predicting the non-operational time period on the basis of the past history. Furthermore, if the prescribed time period to be zero, then it is judged whether or not to carry out preliminary discharge on the basis of the non-operational time only.

Furthermore, in order to attain the above-described object, the present invention is also directed to an inkjet recording apparatus, comprising: a recording head including nozzles which discharge droplets of ink onto a recording medium for printing, the ink containing fine particles of an organic pigment manufactured by the steps of: flowing a solution of an organic pigment dissolved in an alkaline or acidic aqueous medium through a channel which provides a laminar flow; and changing a hydrogen ion exponent (pH) of the solution in a course of the laminar flow; a computing device which computes a non-operational time period for the nozzle; a calculating device which calculates a predicted non-operational time period until a next operation of the nozzle; and a preliminary discharge control device which performs control whereby: in one of the nozzles to be operated in a next image, preliminary discharge of the nozzle is carried out when a total of the non-operational time period and the predicted non-operational time period exceeds a first reference time period; and in one of the nozzles not to be operated in the next image, preliminary discharge of the nozzle is carried out when a total of the non-operational time period and a time period from a current time until printing of a trailing end portion of the next image has completed, exceeds a second reference time period.

In other words, since control is performed whereby, in a nozzle that is to be operated in the next image, preliminary discharge is carried out if the total of the non-operational time period since the last operation of that nozzle and the predicted time period until the nozzle is next operated exceeds the first reference time period, and in a nozzle that is not to be operated in the next image, preliminary discharge is carried out, if the total of the non-operational time period and the time period until printing of the trailing end portion of the next image has completed, exceeds the second reference time period, then this means that the necessity of preliminary discharge is judged in accordance with the operational or non-operational status of the nozzle according to the print contents, and furthermore, a plurality of reference time periods are provided according to the operational or non-operational status of the nozzle, and it is controlled whether or not to carry out preliminary discharge on the basis of these reference time periods. Consequently, it is possible to reduce the number of preliminary discharge operations, and furthermore, the ink consumed due to preliminary discharge can also be reduced.

Preferably, the preliminary discharge control device performs control in a case where a plurality of prints of a same image are to be executed whereby: in one of the nozzles to be operated, preliminary discharge of the nozzle is carried out when a first one of the plurality of prints is executed if the total of the non-operational time period and the predicted non-operational time period exceeds the first reference time period; and in one of the nozzles not to be operated, preliminary discharge of the nozzle is carried out when each of the plurality of prints is executed if a total of the non-operational time period and a time period until printing of a trailing end portion of the next print is completed exceeds the second reference time period during printing of the next print.

More specifically, since preliminary discharge is prevented from being carried out frequently during actual printing, it is possible to print desirable images, without impairing productivity, and furthermore, the amount of ink consumed due to preliminary discharge can also be reduced.

For example, the reference time period and the first reference time period can be a time period until discharge abnormality in the ink-droplets discharged from the nozzles occurs.

A discharge abnormality may be a discharge volume abnormality wherein ink of a different amount to the intended amount of ink is discharged, or a discharge direction abnormality wherein ink is discharged in a direction that differs from the intended discharge direction. Moreover, the occurrence of splashes, or the like, is also included in discharge abnormalities. When discharge abnormalities of this kind occur, then this readily leads to a decline in the quality of the printing results.

It can be judged whether or not discharge abnormalities have arisen by considering variation in ink discharge, and the direction of discharge.

For example, the second reference time period can be a time period until discharge failure occurs whereby ink is not discharged from the nozzles by prescribed driving.

A discharge error may be a state where the ink cannot be discharged, even if the prescribed pressure is applied to the ink, or it may be a state where the ink cannot be discharged, even if the maximum pressure that can be output by the drive source (actuator) supplying pressure to the ink is applied to the ink.

Since nozzles which have developed discharge failure cannot be recovered by preliminary discharge, a recovery operation, such as suctioning by means of a pump, or the like, is performed. It is necessary to carry out preliminary discharge before a discharge failure develops, in other words, while the nozzle can still be recovered by means of preliminary discharge.

Preferably, each of the reference time period, the first reference time period and the second reference time period is determined in accordance with at least one of a type of ink and use environmental conditions of the recording head.

Types of ink include pigment inks, and the like, and the constituents vary depending on the type of ink, which means that the time until viscosity starts to increase and the rate of advance of viscosity increase also varies. Furthermore, the time until viscosity starts to increase and the rate of advance of viscosity increase vary depending on the use environmental conditions, such as the use temperature, humidity, and the like.

If the time at which the viscosity starts to increase becomes earlier, or the rate of advance of the viscosity increased becomes quicker, then the reference time period, and the first reference time period and the second reference time period should be set to shorter times than normal.

Preferably, the solution of the organic pigment contains at least one dispersing agent. According to this, it is possible to obtain the organic pigment fine particles of a nanometer size and excellent monodispersion, so that the saturation of the image formed by the pigment ink is further improved, and the discharge error is prevented more effectively.

Preferably, the fine particles of the organic pigment have a mode diameter of 1 μm or less. This means that the distribution range of the organic pigment fine particles is narrow in terms of their chemical composition and crystal structure. Thus, the organic pigment fine particles are uniform in terms of their property, so that it is possible to obtain images of high resolution and high saturation by means of the pigment ink more reliably, and the discharge error is prevented more effectively.

Preferably, the solution of the organic pigment is alkaline; and the organic pigment is a quinacridone-series pigment represented by the following Formula (I):

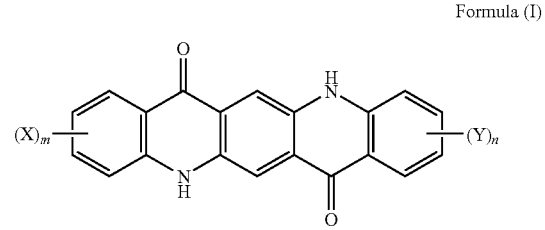

Formula (I)

where X and Y each independently represent a fluorine atom, a chlorine atom, an alkyl group having 1 to 3 carbon atoms, an alkoxy group having 1 to 3 carbon atoms, or a $COOR_a$ group in which $R_a$ represents a hydrogen atom, or an alkyl group having 1 to 10 carbon atoms; and m and n each independently are 0, 1 or 2.

If the solution of the organic pigment is alkaline, the solution as such can be used as the solvent of the ink. The quinacridone-series pigment is relatively preferable among various pigments to be used in pigment-based ink, and hence the fine particles are preferably made of the quinacridone-series pigment.

Preferably, the ink ejected from the recording head is alkaline; and at least a part of the recording head to be in contact with the ink is made of an alkaline-resistant material. According to this, alkaline dispersion containing alkaline pigment such as the quinacridone-series pigment can be conveniently used in the recording head without further countermeasures.

According to the present invention, the pigment ink containing the pigment particles of fine particle size and excellent monodispersion is ejected from the recording head, and the control is performed in such a manner that discharge errors can be prevented from occurring in operating nozzles during the course of printing, so that it is possible to prevent errors in discharge of the ink.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 3C is a perspective plan view showing another example of the configuration of the print head;

DETAILED DESCRIPTION OF THE PREFERRED EMBODIMENTS

Among pigment ink and inkjet recording apparatus according to embodiments of the present invention, the inkjet recording apparatus is hereinafter described.

General Configuration of an Inkjet Recording Apparatus

Figure 1:
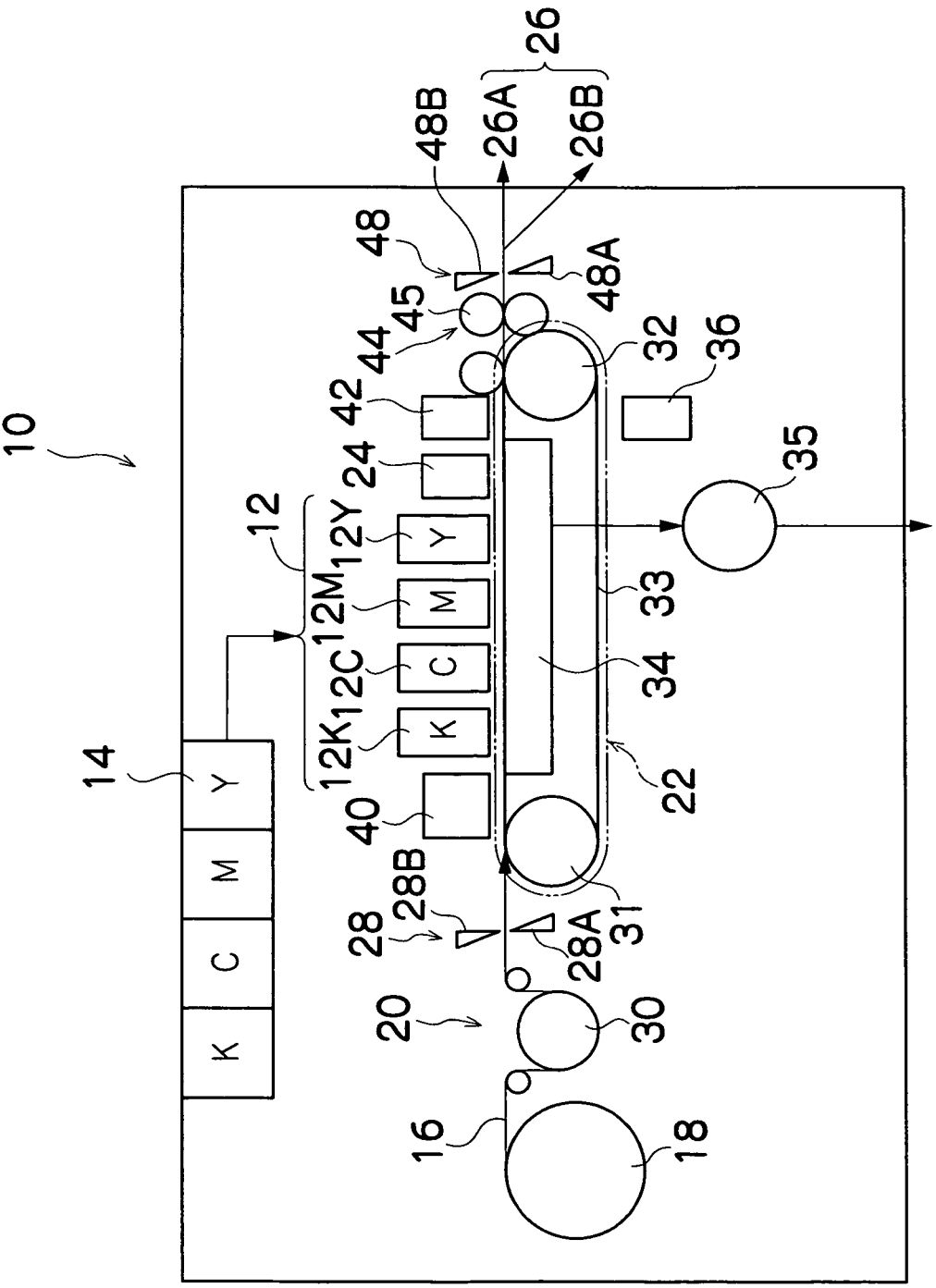
FIG. 1 is a general schematic drawing of an inkjet recording apparatus according to an embodiment of the present invention.

FIG. 1 is a general schematic drawing of an inkjet recording apparatus according to an embodiment of the present invention. As shown in FIG. 1, the inkjet recording apparatus 10 comprises: a printing unit 12 having a plurality of print heads 12K, 12C, 12M, and 12Y for ink colors of black (K), cyan (C), magenta (M), and yellow (Y), respectively; an ink storing/loading unit 14 for storing inks to be supplied to the print heads 12K, 12C, 12M, and 12Y; a paper supply unit 18 for supplying recording paper 16; a decurling unit 20 for removing curl in the recording paper 16; a line CCD sensor 21 for determining the shape, orientation, and position of the recording paper 16; a suction belt conveyance unit 22 disposed facing the nozzle face (ink-droplet ejection face) of the print unit 12, for conveying the recording paper 16 while keeping the recording paper 16 flat; a print determination unit 24 for reading the printed result produced by the printing unit 12; and a paper output unit 26 for outputting image-printed recording paper (printed matter) to the exterior.

In FIG. 1, a single magazine for rolled paper (continuous paper) is shown as an example of the paper supply unit 18; however, a plurality of magazines with paper differences such as paper width and quality may be jointly provided. Moreover, paper may be supplied with a cassette that contains cut paper loaded in layers and that is used jointly or in lieu of a magazine for rolled paper.

In the case of a configuration in which a plurality of types of recording paper can be used, it is preferable that a information recording medium such as a bar code and a wireless tag containing information about the type of paper is attached to the magazine, and by reading the information contained in the information recording medium with a predetermined reading device, the type of paper to be used is automatically determined, and ink-droplet ejection is controlled so that the ink-droplets are ejected in an appropriate manner in accordance with the type of paper.

The recording paper 16 delivered from the paper supply unit 18 retains curl due to having been loaded in the magazine. In order to remove the curl, heat is applied to the recording paper 16 in the decurling unit 20 by a heating drum 30 in the direction opposite from the curl direction in the magazine. The heating temperature at this time is preferably controlled so that the recording paper 16 has a curl in which the surface on which the print is to be made is slightly round outward.

In the case of the configuration in which roll paper is used, a cutter (first cutter) 28 is provided as shown in FIG. 1, and the continuous paper is cut into a desired size by the cutter 28. The cutter 28 has a stationary blade 28A, whose length is equal to or greater than the width of the conveyor pathway of the recording paper 16, and a round blade 28B, which moves along the stationary blade 28A. The stationary blade 28A is disposed on the reverse side of the printed surface of the recording paper 16, and the round blade 28B is disposed on the printed surface side across the conveyor pathway. When cut paper is used, the cutter 28 is not required.

The decurled and cut recording paper 16 is delivered to the suction belt conveyance unit 22. The suction belt conveyance unit 22 has a configuration in which an endless belt 33 is set around rollers 31 and 32 so that the portion of the endless belt 33 facing at least the nozzle face of the printing unit 12 and the sensor face of the print determination unit 24 forms a horizontal plane (flat plane).

The belt 33 has a width that is greater than the width of the recording paper 16, and a plurality of suction apertures (not shown) are formed on the belt surface. A suction chamber 34 is disposed in a position facing the sensor surface of the print determination unit 24 and the nozzle surface of the printing unit 12 on the interior side of the belt 33, which is set around the rollers 31 and 32, as shown in FIG. 1; and the suction chamber 34 provides suction with a fan 35 to generate a negative pressure, and the recording paper 16 is held on the belt 33 by suction.

The belt 33 is driven in the clockwise direction in FIG. 1 by the motive force of a motor (not shown in FIG. 1, but shown as a motor 88 in FIG. 7) being transmitted to at least one of the rollers 31 and 32, which the belt 33 is set around, and the recording paper 16 held on the belt 33 is conveyed from left to right in FIG. 1.

Since ink adheres to the belt 33 when a marginless print job or the like is performed, a belt-cleaning unit 36 is disposed in a predetermined position (a suitable position outside the printing area) on the exterior side of the belt 33. Although the details of the configuration of the belt-cleaning unit 36 are not depicted, examples thereof include a configuration in which the belt 33 is nipped with a cleaning roller such as a brush roller and a water absorbent roller, an air blow configuration in which clean air is blown onto the belt 33, or a combination of these. In the case of the configuration in which the belt 33 is nipped with the cleaning roller, it is preferable to make the line velocity of the cleaning roller different than that of the belt 33 to improve the cleaning effect.

The inkjet recording apparatus 10 can comprise a roller nip conveyance mechanism, in which the recording paper 16 is pinched and conveyed with nip rollers, instead of the suction belt conveyance unit 22. However, there is a drawback in the roller nip conveyance mechanism that the print tends to be smeared when the printing area is conveyed by the roller nip action because the nip roller makes contact with the printed surface of the paper immediately after printing. Therefore, the suction belt conveyance in which nothing comes into contact with the image surface in the printing area is preferable.

A heating fan 40 is disposed on the upstream side of the printing unit 12 in the conveyance pathway formed by the suction belt conveyance unit 22. The heating fan 40 blows heated air onto the recording paper 16 to heat the recording paper 16 immediately before printing so that the ink deposited on the recording paper 16 dries more easily.

Figure 2:
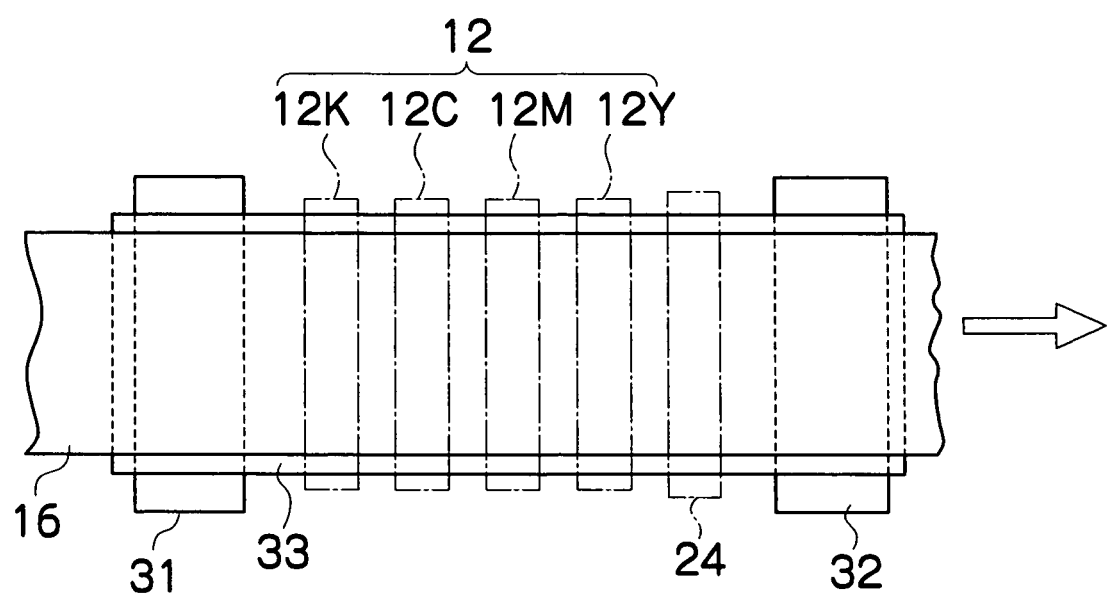
FIG. 2 is a plan view of principal components of an area around a printing unit of the inkjet recording apparatus in FIG. 1.

As shown in FIG. 2, the printing unit 12 forms a so-called full-line head in which a line head having a length that corresponds to the maximum paper width is disposed in the main scanning direction perpendicular to the delivering direction of the recording paper 16 (hereinafter referred to as the paper conveyance direction) represented by the arrow in FIG. 2, which is substantially perpendicular to a width direction of the recording paper 16. A specific structural example is described later with reference to FIGS. 3A to 5. Each of the print heads 12K, 12C, 12M, and 12Y is composed of a line head, in which a plurality of ink-droplet ejection apertures (nozzles) are arranged along a length that exceeds at least one side of the maximum-size recording paper 16 intended for use in the inkjet recording apparatus 10, as shown in FIG. 2.

The print heads 12K, 12C, 12M, and 12Y are arranged in this order from the upstream side along the paper conveyance direction. A color print can be formed on the recording paper 16 by ejecting the inks from the print heads 12K, 12C, 12M, and 12Y, respectively, onto the recording paper 16 while conveying the recording paper 16.

Although the configuration with the KCMY four standard colors is described in the present embodiment, combinations of the ink colors and the number of colors are not limited to those, and light and/or dark inks can be added as required. For example, a configuration is possible in which print heads for ejecting light-colored inks such as light cyan and light magenta are added. Moreover, a configuration is possible in which a single print head adapted to record an image in the colors of CMY or KCMY is used instead of the plurality of print heads for the respective colors.

The print unit 12, in which the full-line heads covering the entire width of the paper are thus provided for the respective ink colors, can record an image over the entire surface of the recording paper 16 by performing the action of moving the recording paper 16 and the print unit 12 relatively to each other in the sub-scanning direction just once (i.e., with a single sub-scan). Higher-speed printing is thereby made possible and productivity can be improved in comparison with a shuttle type head configuration in which a print head reciprocates in the main scanning direction.

As shown in FIG. 1, the ink storing/loading unit 14 has tanks for storing the inks to be supplied to the print heads 12K, 12C, 12M, and 12Y, and the tanks are connected to the print heads 12K, 12C, 12M, and 12Y through channels (not shown), respectively. The ink storing/loading unit 14 has a warning device (e.g., a display device, an alarm sound generator) for warning when the remaining amount of any ink is low, and has a mechanism for preventing loading errors among the colors.

The print determination unit 24 has an image sensor for capturing an image of the ink-droplet deposition result of the print unit 12, and functions as a device to check for ejection defects such as clogs of the nozzles in the print unit 12 from the ink-droplet deposition results evaluated by the image sensor.

The print determination unit 24 of the present embodiment is configured with at least a line sensor having rows of photoelectric transducing elements with a width that is greater than the ink-droplet ejection width (image recording width) of the print heads 12K, 12C, 12M, and 12Y. This line sensor has a color separation line CCD sensor including a red (R) sensor row composed of photoelectric transducing elements (pixels) arranged in a line provided with an R filter, a green (G) sensor row with a G filter, and a blue (B) sensor row with a B filter. Instead of a line sensor, it is possible to use an area sensor composed of photoelectric transducing elements which are arranged two-dimensionally.

The print determination unit 24 reads a test pattern printed with the print heads 12K, 12C, 12M, and 12Y for the respective colors, and the ejection of each head is determined. The ejection determination includes the presence of the ejection, measurement of the dot size, and measurement of the dot deposition position. The ejection determination is described in detail later.

A post-drying unit 42 is disposed following the print determination unit 24. The post-drying unit 42 is a device to dry the printed image surface, and includes a heating fan, for example. It is preferable to avoid contact with the printed surface until the printed ink dries, and a device that blows heated air onto the printed surface is preferable.

A heating/pressurizing unit 44 is disposed following the post-drying unit 42. The heating/pressurizing unit 44 is a device to control the glossiness of the image surface, and the image surface is pressed with a pressure roller 45 having a predetermined uneven surface shape while the image surface is heated, and the uneven shape is transferred to the image surface.

The printed matter generated in this manner is outputted from the paper output unit 26. The target print (i.e., the result of printing the target image) and the test print are preferably outputted separately. In the inkjet recording apparatus 10, a sorting device (not shown) is provided for switching the outputting pathway in order to sort the printed matter with the target print and the printed matter with the test print, and to send them to paper output units 26A and 26B, respectively. When the target print and the test print are simultaneously formed in parallel on the same large sheet of paper, the test print portion is cut and separated by a cutter (second cutter) 48. The cutter 48 is disposed directly in front of the paper output unit 26, and is used for cutting the test print portion from the target print portion when a test print has been performed in the blank portion of the target print. The structure of the cutter 48 is the same as the first cutter 28 described above, and has a stationary blade 48A and a round blade 48B.

Although not shown in FIG. 1, a sorter for collecting prints according to print orders is provided to the paper output unit 26A for the target prints.

Next, the structure of the print heads is described. The print heads 12K, 12C, 12M, and 12Y provided for the ink colors have the same structure, and a reference numeral 50 is hereinafter designated to any of the print heads 12K, 12C, 12M, and 12Y.

Figure 3A:
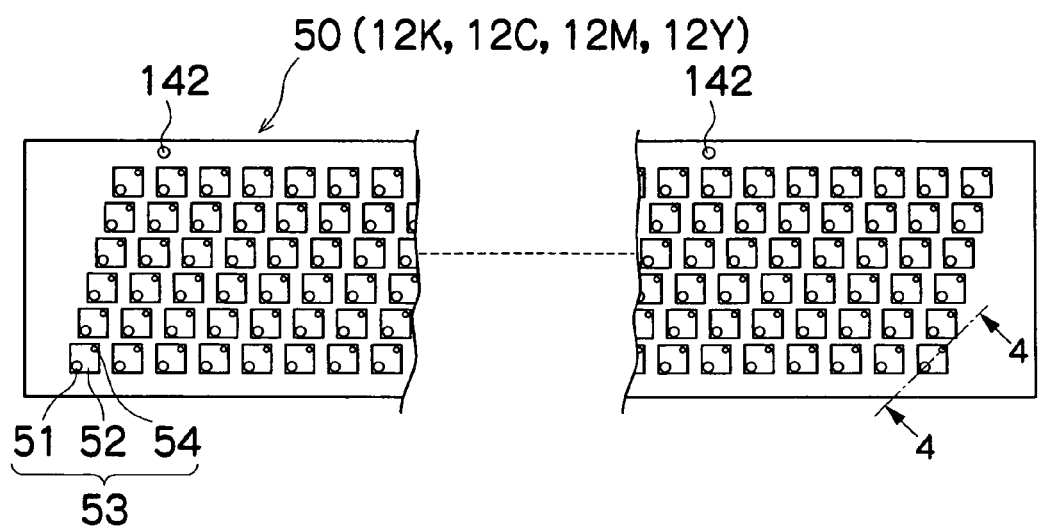
FIG. 3A is a perspective plan view showing an example of a configuration of a print head.
Figure 3B:
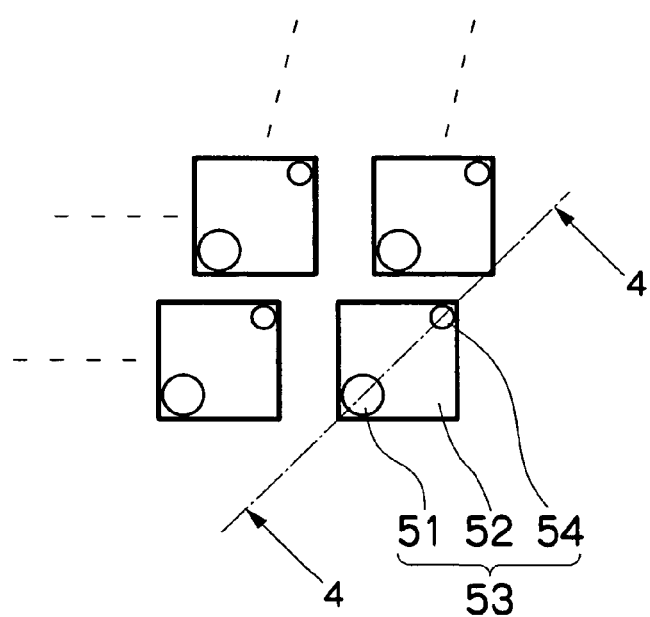
FIG. 3B is a partial enlarged view of FIG. 3A.
Figure 4:
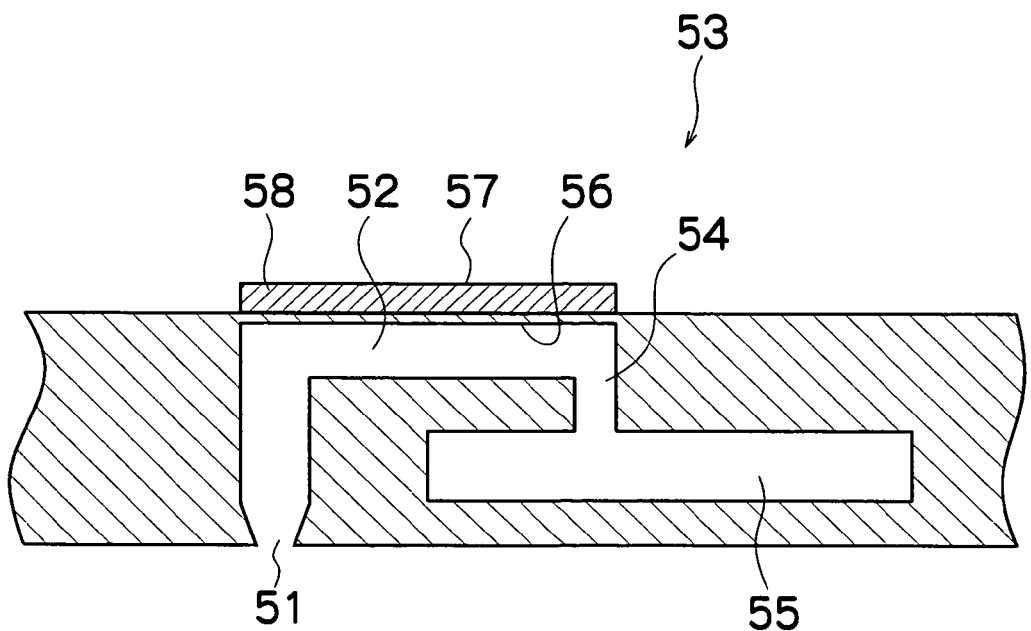
FIG. 4 is a cross-sectional view along a line 4-4 in FIGS. 3A and 3B.

FIG. 3A is a perspective plan view showing an example of the configuration of the print head 50, FIG. 3B is an enlarged view of a portion thereof, FIG. 3C is a perspective plan view showing another example of the configuration of the print head, and FIG. 4 is a cross-sectional view taken along the line 4-4 in FIGS. 3A and 3B, showing the inner structure of an ink chamber unit.

The nozzle pitch in the print head 50 should be minimized in order to maximize the density of the dots printed on the surface of the recording paper. As shown in FIGS. 3A, 3B, 3C and 4, the print head 50 in the present embodiment has a structure in which a plurality of ink chamber units 53 including nozzles 51 for ejecting ink-droplets and pressure chambers 52 connecting to the nozzles 51 are disposed in the form of a staggered matrix, and the effective nozzle pitch is thereby made small.

Thus, as shown in FIGS. 3A and 3B, the print head 50 in the present embodiment is a full-line head in which one or more of nozzle rows in which the ink discharging nozzles 51 are arranged along a length corresponding to the entire width of the recording medium in the direction substantially perpendicular to the conveyance direction of the recording medium.

Alternatively, as shown in FIG. 3C, a full-line head can be composed of a plurality of short two-dimensionally arrayed head units 50' arranged in the form of a staggered matrix and combined so as to form nozzle rows having lengths that correspond to the entire width of the recording paper 16.

The planar shape of the pressure chamber 52 provided for each nozzle 51 is substantially a square, and the nozzle 51 and an inlet of supplied ink (supply port) 54 are disposed in both corners on a diagonal line of the square. As shown in FIG. 4, each pressure chamber 52 is connected to a common channel 55 through the supply port 54. The common channel 55 is connected to an ink supply tank, which is a base tank that supplies ink, and the ink supplied from the ink tank is delivered through the common flow channel 55 to the pressure chamber 52.

An actuator 58 having a discrete electrode 57 is joined to a pressure plate 56, which forms the ceiling of the pressure chamber 52, and the actuator 58 is deformed by applying drive voltage to the discrete electrode 57 to eject ink from the nozzle 51. When ink is ejected, new ink is delivered from the common flow channel 55 through the supply port 54 to the pressure chamber 52.

Figure 5:
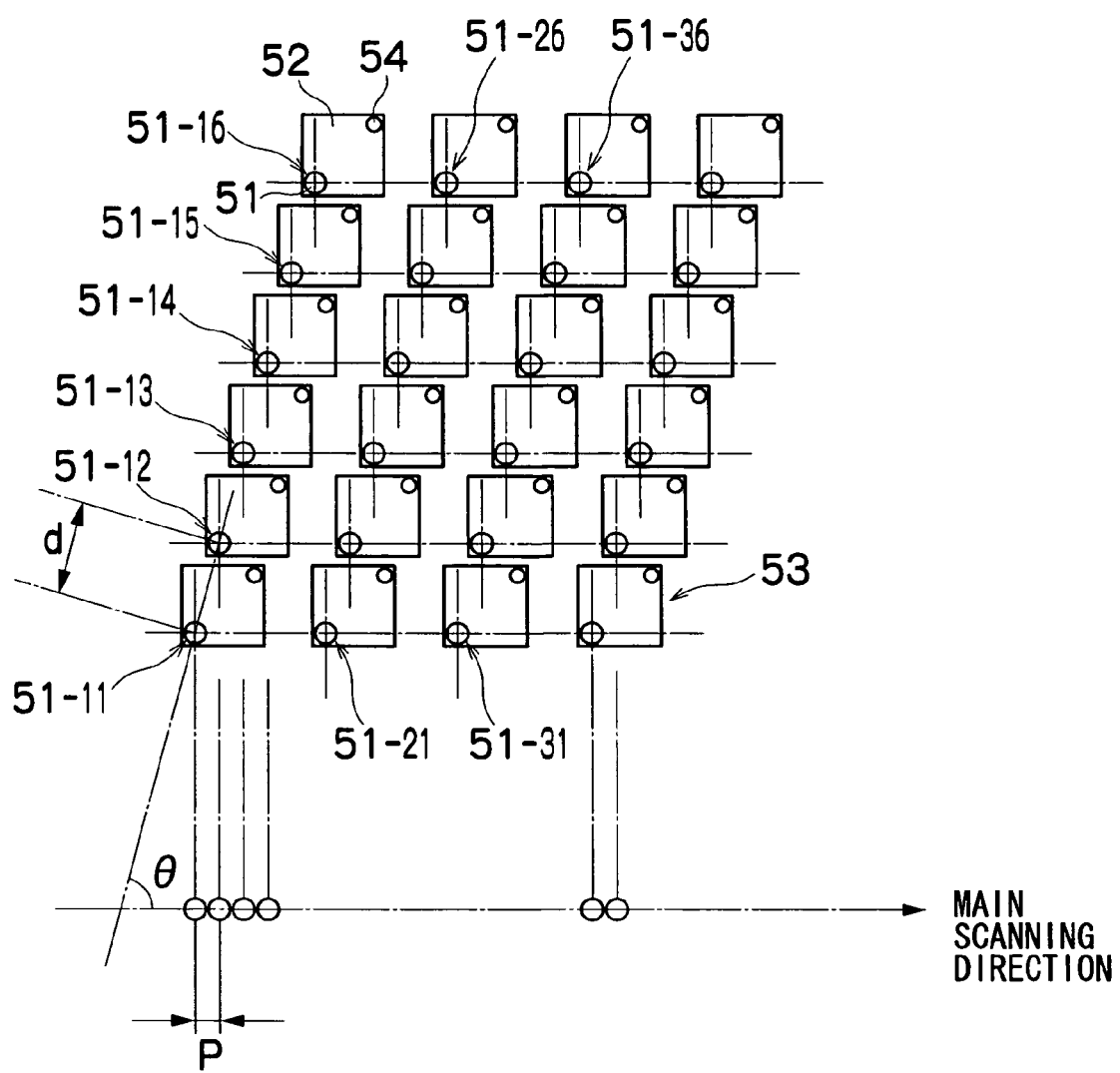
FIG. 5 is an enlarged view showing nozzle arrangement of the print head in FIG. 3A.

The plurality of ink chamber units 53 having such a structure are arranged in a grid with a fixed pattern in the line-printing direction along the main scanning direction and in the diagonal-row direction forming a fixed angle θ that is not a right angle with the main scanning direction, as shown in FIG. 5. With the structure in which the plurality of rows of ink chamber units 53 are arranged at a fixed pitch d in the direction at the angle θ with respect to the main scanning direction, the nozzle pitch P as projected in the main scanning direction is d×cos θ.

Hence, the nozzles 51 can be regarded to be equivalent to those arranged at a fixed pitch P on a straight line along the main scanning direction. Such configuration results in a nozzle structure in which the nozzle row projected in the main scanning direction has a high density of up to 2,400 nozzles per inch. For convenience in description, the structure is described below as one in which the nozzles 51 are arranged at regular intervals (pitch P) in a straight line along the lengthwise direction of the head 50, which is parallel with the main scanning direction.

In a full-line head comprising rows of nozzles that have a length corresponding to the maximum recordable width, the "main scanning" is defined as to print one line (a line formed of a row of dots, or a line formed of a plurality of rows of dots) in the width direction of the recording paper (the direction perpendicular to the delivering direction of the recording paper) by driving the nozzles in one of the following ways: (1) simultaneously driving all the nozzles; (2) sequentially driving the nozzles from one side toward the other; and (3) dividing the nozzles into blocks and sequentially driving the blocks of the nozzles from one side toward the other.

In particular, when the nozzles 51 arranged in a matrix such as that shown in FIG. 5 are driven, the main scanning according to the above-described (3) is preferred. More specifically, the nozzles 51-11, 51-12, 51-13, 51-14, 51-15 and 51-16 are treated as a block (additionally; the nozzles 51-21, 51-22, . . . , 51-26 are treated as another block; the nozzles 51-31, 51-32, . . . , 51-36 are treated as another block, . . . ); and one line is printed in the width direction of the recording paper 16 by sequentially driving the nozzles 51-11, 51-12, . . . , 51-16 in accordance with the conveyance velocity of the recording paper 16.

On the other hand, the "sub-scanning" is defined as to repeatedly perform printing of one line (a line formed of a row of dots, or a line formed of a plurality of rows of dots) formed by the main scanning, while moving the full-line head and the recording paper relatively to each other.

In the implementation of the present invention, the structure of the nozzle arrangement is not particularly limited to the examples shown in the drawings. Moreover, the present embodiment adopts the structure that ejects ink-droplets by deforming the actuator 58 such as a piezoelectric element; however, the implementation of the present invention is not particularly limited to this. Instead of the piezoelectric inkjet method, various methods may be adopted including a thermal inkjet method in which ink is heated by a heater or another heat source to generate bubbles, and ink-droplets are ejected by the pressure thereof.

Figure 6:
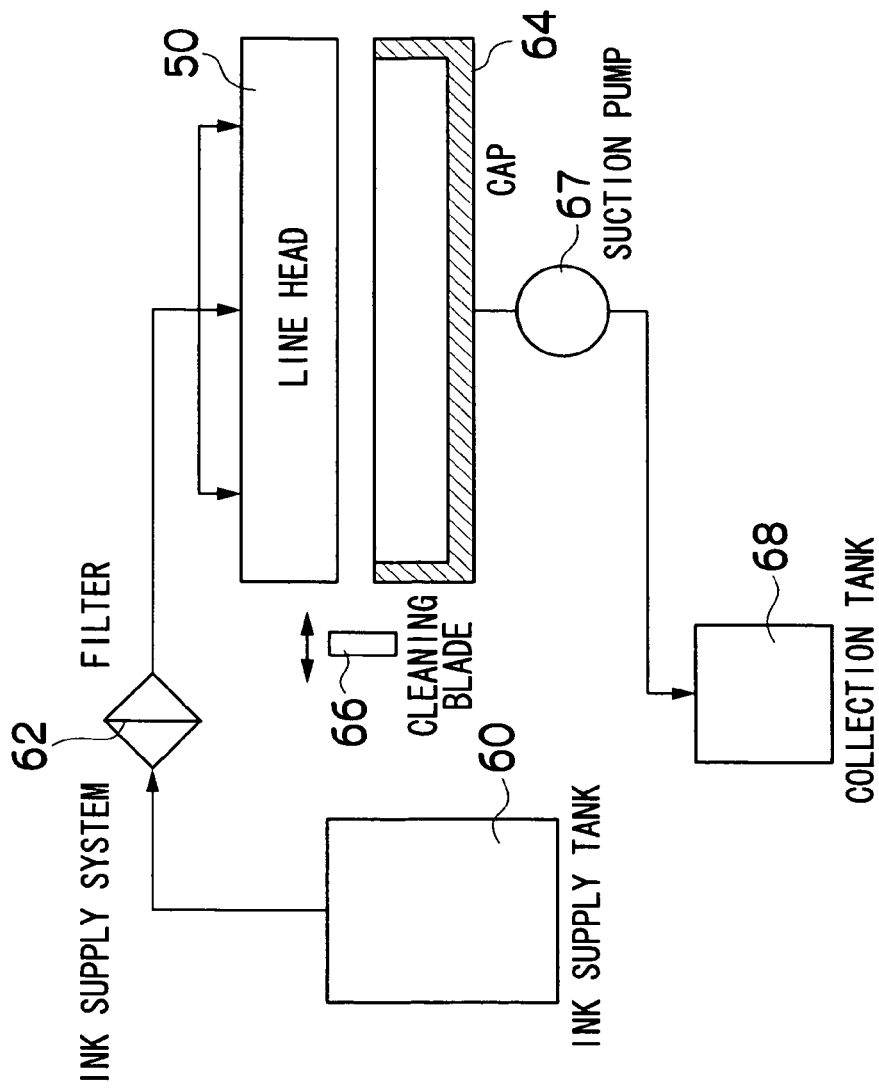
FIG. 6 is a schematic drawing showing a configuration of an ink supply system in the inkjet recording apparatus.

FIG. 6 is a schematic drawing showing the configuration of the ink supply system in the inkjet recording apparatus 10.

An ink supply tank 60 is a base tank that supplies ink and is set in the ink storing/loading unit 14 described with reference to FIG. 1. The aspects of the ink supply tank 60 include a refillable type and a cartridge type: when the remaining amount of ink is low, the ink supply tank 60 of the refillable type is filled with ink through a filling port (not shown) and the ink supply tank 60 of the cartridge type is replaced with a new one. In order to change the ink type in accordance with the intended application, the cartridge type is suitable, and it is preferable to represent the ink type information with a bar code or the like on the cartridge, and to perform ejection control in accordance with the ink type. The ink supply tank 60 in FIG. 6 is equivalent to the ink storing/loading unit 14 in FIG. 1 described above.

A filter 62 for removing foreign matters and bubbles is disposed between the ink supply tank 60 and the print head 50, as shown in FIG. 6. The filter mesh size in the filter 62 is preferably equivalent to or less than the diameter of the nozzle and commonly about 20 μm.

Although not shown in FIG. 6, it is preferable to provide a sub-tank integrally to the print head 50 or nearby the print head 50. The sub-tank has a damper function for preventing variation in the internal pressure of the head and a function for improving refilling of the print head.

The inkjet recording apparatus 10 is also provided with a maintenance unit 96 (not shown in FIG. 6, but shown in FIG. 7) including a cap 64 as a device to prevent the nozzle 51 from drying out or to prevent an increase in the ink viscosity in the vicinity of the nozzles, and a cleaning blade 66 as a device to clean the ink discharge face of the nozzle 51.

The maintenance unit 96 including the cap 64 and the cleaning blade 66 can be moved in a relative fashion with respect to the print head 50 by a movement mechanism (not shown), and is moved from a predetermined holding position to a maintenance position below the print head 50 as required.

The cap 64 is displaced up and down in a relative fashion with respect to the print head 50 by an elevator mechanism (not shown). When the power of the inkjet recording apparatus 10 is switched OFF or when in a print standby state, the cap 64 is raised to a predetermined elevated position so as to come into close contact with the print head 50, and the ink discharge face of the nozzle 51 is thereby covered with the cap 64.

During printing or standby, when the frequency of use of specific nozzles 51 is reduced and a state in which ink is not discharged continues for a certain amount of time or longer, the ink solvent in the vicinity of the nozzle evaporates and ink viscosity increases. In such a state, ink can no longer be discharged from the nozzle 51 even if the actuator 58 is operated.

Before reaching such a state the actuator 58 is operated (in a viscosity range that allows discharge by the operation of the actuator 58), and a preliminary discharge (purge, air discharge, liquid discharge, dummy discharge) is made toward the cap 64 (ink receptor) to which the degraded ink (ink whose viscosity has increased in the vicinity of the nozzle) is to be discharged.

Also, when bubbles have become intermixed in the ink inside the print head 50 (inside the pressure chamber 52), ink can no longer be discharged from the nozzle even if the actuator 58 is operated. The cap 64 is placed on the print head 50 in such a case, ink (ink in which bubbles have become intermixed) inside the pressure chamber 52 is removed by suction with a suction pump 67, and the suction-removed ink is sent to a collection tank 68.

This suction action entails the suctioning of degraded ink whose viscosity has increased (hardened) when initially loaded into the head, or when service has started after a long period of being stopped. The suction action is performed with respect to all the ink in the pressure chamber 52, so the amount of ink consumption is considerable. Therefore, a preferred aspect is one in which a preliminary discharge is performed when the increase in the viscosity of the ink is small.

The cleaning blade 66 is composed of rubber or another elastic member, and can slide on the ink discharge surface (surface of the nozzle plate) of the print head 50 by means of a blade movement mechanism (wiper, not shown). When ink droplets or foreign matter has adhered to the nozzle plate, the surface of the nozzle plate is wiped, and the surface of the nozzle plate is cleaned by sliding the cleaning blade 66 on the nozzle plate. When the unwanted matter on the ink discharge surface is cleaned by the blade mechanism, a preliminary discharge is carried out in order to prevent the foreign matter from becoming mixed inside the nozzles 51 by the blade.

Figure 7:
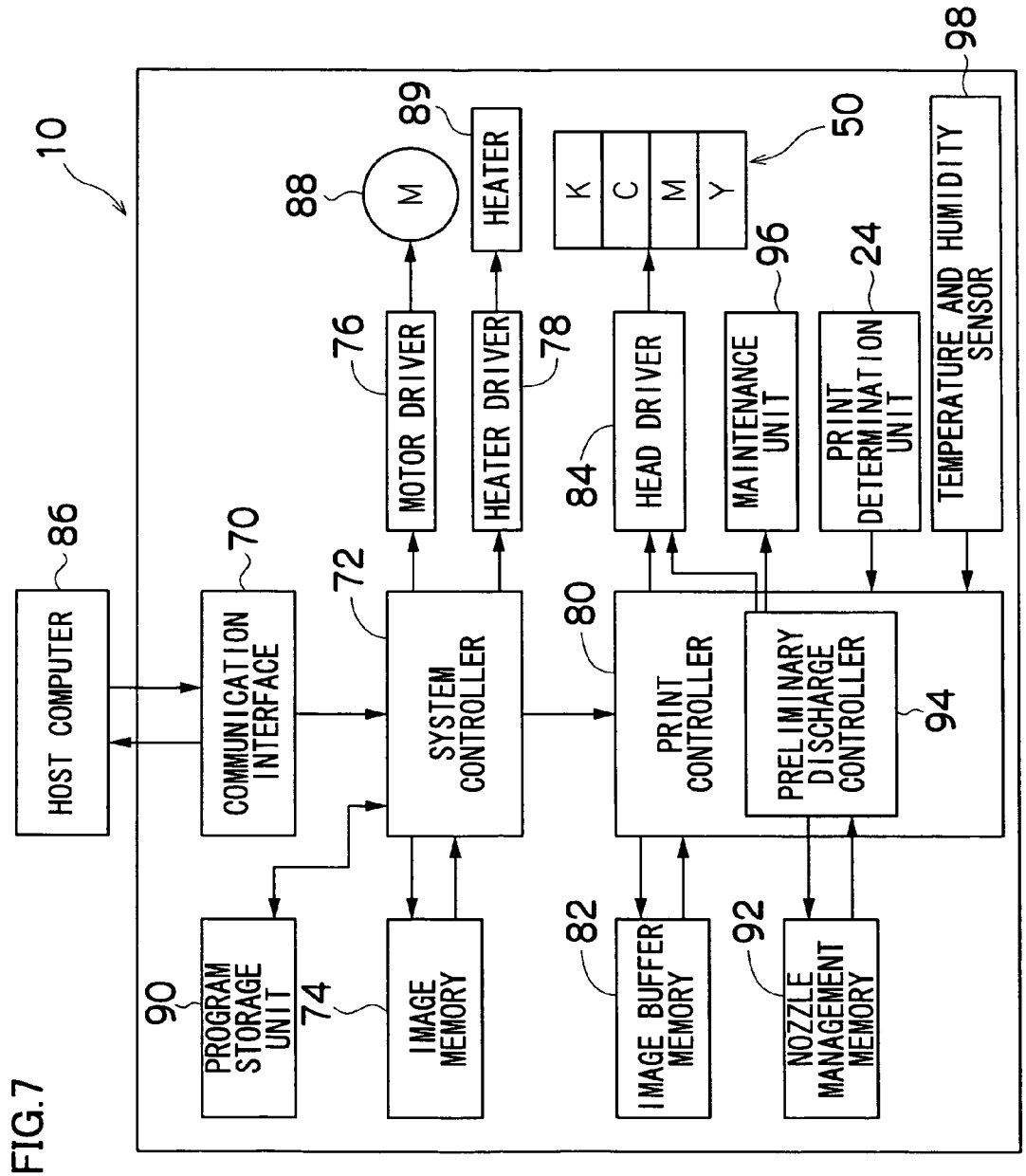
FIG. 7 is a block diagram of principal components showing a system configuration of the inkjet recording apparatus.

FIG. 7 is a block diagram of the principal components showing the system configuration of the inkjet recording apparatus 10. The inkjet recording apparatus 10 has a communication interface 70, a system controller 72, an image memory 74, a motor driver 76, a heater driver 78, a print controller 80, an image buffer memory 82, a head driver 84, a program storage unit 90, a nozzle management memory 92, and other components.

The communication interface 70 is an interface unit for receiving image data sent from a host computer 86. A serial interface such as USB, IEEE1394, Ethernet, wireless network, or a parallel interface such as a Centronics interface may be used as the communication interface 70. A buffer memory (not shown) may be mounted in this portion in order to increase the communication speed. The image data sent from the host computer 86 is received by the inkjet recording apparatus 10 through the communication interface 70, and is temporarily stored in the image memory 74. The image memory 74 is a storage device for temporarily storing images inputted through the communication interface 70, and data is written and read to and from the image memory 74 through the system controller 72. The image memory 74 is not limited to memory composed of a semiconductor element, and a hard disk drive or another magnetic medium may be used.

The system controller 72 controls the communication interface 70, image memory 74, motor driver 76, heater driver 78, and other components. The system controller 72 has a central processing unit (CPU), peripheral circuits therefor, and the like. The system controller 72 controls communication between itself and the host computer 86, controls reading and writing from and to the image memory 74, and performs other functions, and also generates control signals for controlling a heater 89 and the motor 88 in the conveyance system.

The motor driver (drive circuit) 76 drives the motor 88 in accordance with commands from the system controller 72. The heater driver (drive circuit) 78 drives the heater 89 of the post-drying unit 42 or the like in accordance with commands from the system controller 72.

The print controller 80 has a signal processing function for performing various tasks, compensations, and other types of processing for generating print control signals from the image data stored in the image memory 74 in accordance with commands from the system controller 72 so as to apply the generated print control signals (print data) to the head driver 84. Required signal processing is performed in the print controller 80, and the ejection timing and ejection amount of the ink-droplets from the print head 50 are controlled by the head driver 84 on the basis of the image data. Desired dot sizes and dot placement can be brought about thereby.

The print controller 80 is provided with the image buffer memory 82; and image data, parameters, and other data are temporarily stored in the image buffer memory 82 when image data is processed in the print controller 80. The aspect shown in FIG. 7 is one in which the image buffer memory 82 accompanies the print controller 80; however, the image memory 74 may also serve as the image buffer memory 82. Also possible is an aspect in which the print controller 80 and the system controller 72 are integrated to form a single processor.

The head driver 84 drives actuators for the print heads 12K, 12C, 12M, and 12Y of the respective colors on the basis of the print data received from the print controller 80. A feedback control system for keeping the drive conditions for the print heads constant may be included in the head driver 84.

The program storage unit 90 contains various control programs, and each control program is read and carried out according to a command issued by the system controller 72. As the program storage unit 90, a semiconductor memory such as ROM and EEPROM, or a magnetic disk can be used. The program storage unit 90 can have an external interface to use a memory card or a PC card. The program storage unit 90 can be provided with a plurality of types of these storage media.

The program storage unit 90 can also serve as a storage device (not shown) for operational parameters and the like.

The nozzle management memory 92 is a storage device for storing information for managing each of the nozzles 51 in the print head 50. The nozzle management information stored in the nozzle management memory 92 includes: operational time period and non-operational time period of each nozzle (i.e., operational history of each nozzle); predicted operational time period and predicted non-operational time period of each nozzle, which are acquired through the communication interface 70 and the print controller 80 according to the image data (image information) stored in the memory 74 or the image buffer memory 82; a reference time period for performing a preliminary discharge for each nozzle; and so on. Moreover, the nozzle management information stored in the nozzle management memory 92 may further include various other information such as locality information of each nozzle.

The print controller 80 includes a preliminary discharge controller 94, which determines condition of each nozzle according to the nozzle management information stored in the nozzle management memory 92. The preliminary discharge controller 94 outputs prescribed command signals to the head driver 84 and the maintenance unit 96 when deciding that nozzle maintenance action such as preliminary discharge is required.

When making a decision on performance of a nozzle maintenance action, the temperature and humidity inside the inkjet recording apparatus 10, particularly in the vicinity of the print head 50 are important factors. There is a tendency for the increase in the viscosity of the ink to progress more rapidly and for the meniscus surface to dry out more readily, the hotter the temperature in the vicinity of the print head 50. Moreover, there is a tendency for the meniscus surface to dry out more readily, the lower the humidity in the vicinity of the print head 50. Hence, the inkjet recording apparatus 10 is provided with a temperature and humidity sensor 98, which measures the temperature and humidity of parts inside the inkjet recording apparatus 10 and outputs temperature and humidity information to the print controller 80. According to the temperature and humidity information, the preliminary discharge controller 94 in the print controller 80 carries out the control such as changing the reference time period for performing a preliminary discharge.

The print determination unit 24 is a block that includes the line sensor as described above with reference to FIG. 1, reads the image printed on the recording paper 16, determines the print conditions (presence of the ejection, variation in the dot deposition, and the like) by performing desired signal processing, or the like, and provides the determination results of the print conditions to the print controller 80.

The print controller 80 makes various compensation with respect to the print head 50 as required on the basis of the information obtained from the print determination unit 24.

In the embodiment shown in FIG. 1, a configuration is adopted in which the print determination unit 24 is disposed on the printed surface side, the printed surface is illuminated by a cold-cathode tube or other light source (not shown) disposed in the vicinity of the line sensor, and the light reflected on the printed surface is read with the line sensor. However, other configurations are also possible in the implementation of the present invention.

Naturally, the members of the inkjet recording apparatus 10 in contact with the ink are made of materials resistant to alkaline ink. Resin materials suitable for the ink supply tank 60, the print heads 50, and the like include polystyrene, polyethylene, polypropylene, and ABS resin. The ink contacting parts in the pressure chamber 52 and the like are preferably coated with polytetrafluoroethylene, or made of metal including SUS304, SUS316, and SUS316L. Rubber materials suitable for the tubes in the ink supply system include vinylmethyl silicone rubber, fluorosilicone rubber, and ethylenepropylene rubber.

Preliminary Discharge Control

In general, in an inkjet recording apparatus, preliminary discharge is carried out at fixed time intervals, in order to prevent discharge errors (unsatisfactory discharges) or discharge failures in the nozzles 51. By carrying out preliminary discharge at fixed time intervals, ink droplets are discharged correctly from the nozzles 51, and hence a prescribed printing quality can be ensured. However, if preliminary discharge is carried out frequently, then the productivity of the actual printing process will fall, and furthermore, ink will be consumed in a wasteful manner.

In order to resolve problems of this kind, control is implemented in such a manner that preliminary discharge is carried out at a preferable timing, in the inkjet recording apparatus 10.

Figure 8:
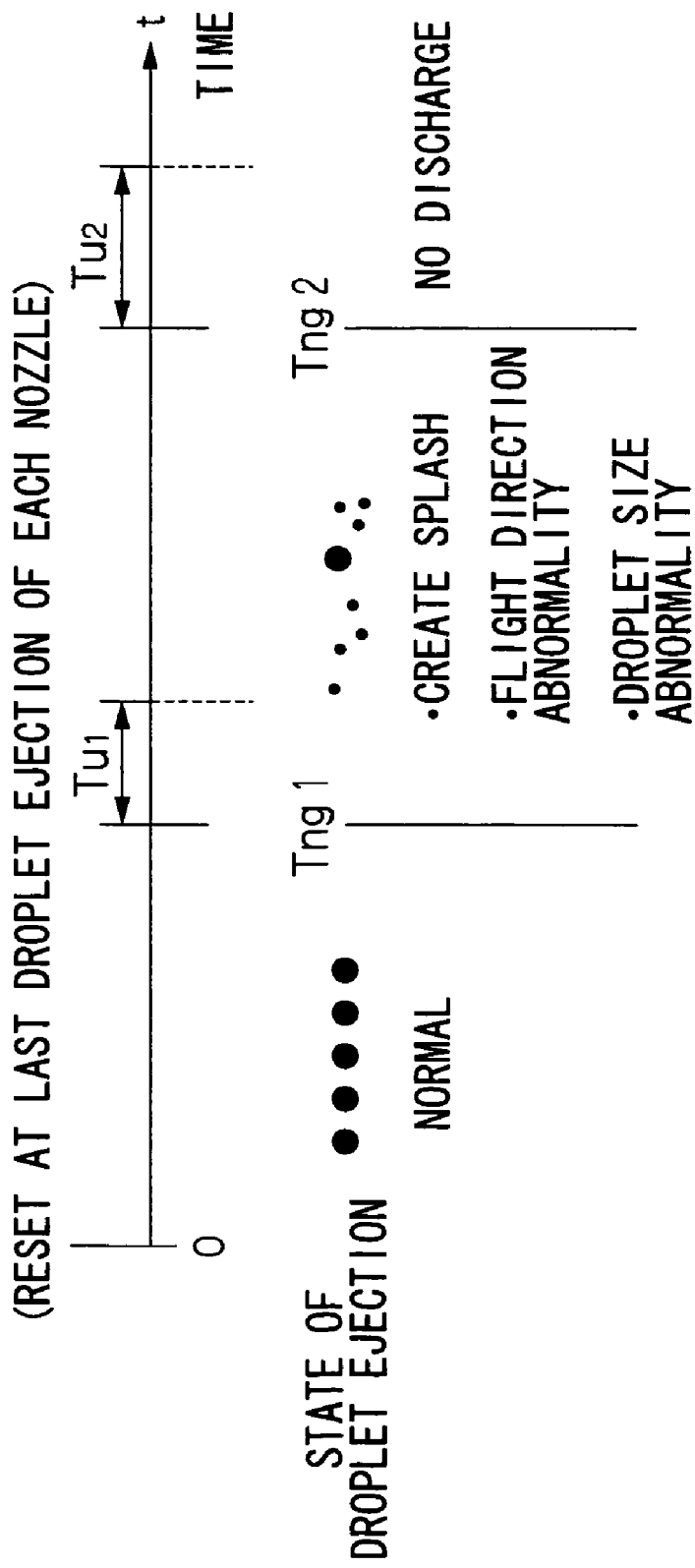
FIG. 8 is a diagram for describing the preliminary discharge reference time period in the inkjet recording apparatus.

FIG. 8 illustrates a preliminary discharge reference time period for the inkjet recording apparatus 10. In the inkjet recording apparatus 10, two parameters are provided in the preliminary discharge reference time period. One of these two parameters is the time period $Tng1$, which is the time period until discharge abnormalities arise, such as splashes starting to occur when ink inside the nozzles 51 is discharged, or abnormalities starting to occur in the direction of flight (direction of discharge) of the ink droplets, or in the size of the ink droplets (amount of ink discharged). The other parameter is the time period $Tng2$ until discharge failures arise, wherein ink cannot be discharged from the nozzles 51 under the pressure applied to the ink by driving the actuator 58 shown in FIG. 4.

Here, examples of the judgment references for discharge abnormalities and discharge failures are described below.

Normal droplet ejection is judged to have occurred if the center of the droplet deposition point onto which an ink droplet is actually deposited lies within a distance of 1.5 times or less of the droplet ejection pitch, from the center of the target position (position towards which the droplet is originally ejected), and a discharge abnormality is judged to have occurred if it lies outside this reference.

Furthermore, if a plurality of droplets are deposited and spread over a range of two times or more of the original deposited droplet size, then a discharge abnormality is judged to have occurred, and if no ink at all is discharged from the nozzle 51, then a discharge failure is judged to have occurred. The judgment references for discharge abnormality and discharge failure given above are examples, and it is possible to apply other judgment criteria.

The time periods $Tng1$ and $Tng2$ described above are dependent on the type of ink (ink viscosity), the ink batch, the use environment (temperature, humidity, atmospheric pressure) of the print head 50, and the environmental history, and therefore, preferably, a mode is adopted wherein variables are used for these parameters in such a manner that the time periods can be changed according to requirements.

For example, if the intrinsic viscosity of the actual ink is different in different types of ink, then $Tng1$ and $Tng2$ are set to smaller values for inks for higher viscosity. It is possible to adopt a composition wherein a radio tag or barcode recording information relating to the ink (the viscosity of the ink) is provided in the ink cartridge, and this ink-related information recorded in the radio tag or barcode is read in when the ink cartridge is replaced, whereby the values of $Tng1$ and $Tng2$ can be set by the system controller 72 shown in FIG. 7, on the basis of the ink information read in.

Furthermore, there is a tendency for the increase in the viscosity of the ink to progress more rapidly, the hotter the temperature, and for the meniscus surface to dry out more readily, the lower humidity. It is also possible to adopt a composition wherein the temperature and humidity can be read in from the temperature and humidity sensor 98 shown in FIG. 7, whereby the values of Tng1 and Tng2 can be set in accordance with the temperature and humidity.

Moreover, it is also possible for the values of Tng1 and Tng2 set in the past to be stored, whereby the average of these values can be determined at a prescribed timing and the settings for Tng1 and Tng2 can be changed on the basis of this average value.

Furthermore, if a piezoelectric element is used for the actuator 58, then before discharge failures occur due to increased viscosity in the ink, it is possible for the ink inside the pressure chamber 52 to be churned by applying slight vibrations to the ink inside the pressure chamber 52 by means of the actuator 58, thereby delaying increase in the viscosity at the meniscus surface (the boundary surface between the ink at the discharge hole of the nozzle 51 and the atmosphere).

The values Tu1 and Tu2 illustrated in FIG. 8 are time periods by which Tng1 and Tng2 can be extended by means of slight vibration of the ink.

The timing at which the slight vibrations are applied may be before the time period exceeds Tng1, or after it exceeds Tng1 but before it exceeds Tng2. Furthermore, the slight vibrations may also be applied at a timing that is independent of the preliminary discharge control. Moreover, preferably, the drive waveform used when applying the slight vibrations to the ink is a rectangular or square waveform. Furthermore, the slight vibrations must also be controlled in such a manner that ink leakages from the nozzle do not occur.

In other words, when the slight vibrations are applied to ink inside the pressure chamber 52, the time period until a discharge abnormality arises will be the total time of Tng1 and Tu1, and the time period until discharge failure arises will be the total time of Tng2 and Tu2. Tu1 and Tu2 are dependent on the type of ink, the ink batch, the use environment, such as the temperature, humidity, atmospheric pressure, and the like, and the environmental history.

If, on the other hand, a thermal type actuator is used, then control for applying slight vibrations to the ink as described above is difficult to achieve, and therefore preliminary discharge is carried out in nearly all cases, in order to deal with increased viscosity in the ink.

Figure 9:
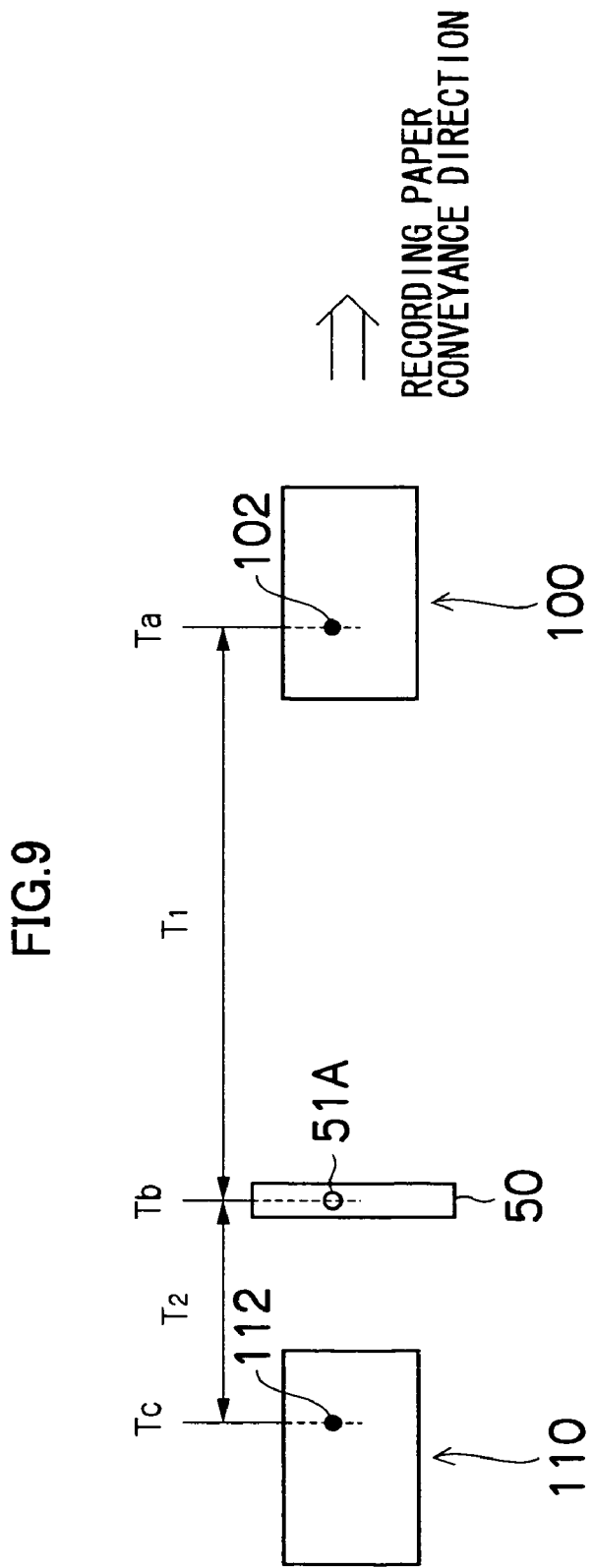
FIG. 9 is a diagram for describing the respective timings of preliminary discharge control in the inkjet recording apparatus.

FIG. 9 illustrates the timing of preliminary discharge control in the inkjet recording apparatus 10. In printing a previous image 100, at timing Ta, a droplet is deposited at a droplet deposition point 102 on the previous image 100, from a certain nozzle 51 A in the print head 50.

The preliminary discharge judgment timing Tb, after the printing of image 100 has completed until printing of the next image 110 has started, is the timing at which it is judged whether or not to carry out preliminary discharge for the nozzle 51A, and the non-operational time period T1 for the nozzle 51A (the time period from the last timing Ta at which a droplet was ejected from the nozzle 51A, until Tb) is measured (recorded), in addition to which, the predicted non-operational time period T2 from Tb until the timing Tc at which a droplet is deposited at the next droplet deposition point 112 in the next image 110 from the nozzle 51 A is also calculated. For example, if the nozzle 51A was operated in the image before last, and it was not operated in the last image, then the non-operational time period T1 will be the time period that has elapsed since the operation of the nozzle 51A two images previously. The waiting time between images (including margin areas) is included in T1 and T2.

The non-operational time period T1 is determined by the system controller 72 and the print controller 80. The nozzle management memory 92 shown in FIG. 7 is used as a memory (storage device) to store the non-operational time period T1 and the predicted non-operational time period T2 temporarily. Furthermore, a memory incorporated into the system controller 72 or another processor may also be used for same.

Moreover, the droplet deposition position on the image for each nozzle is determined from the print data input, and the droplet ejection timing is determined from the conveyance speed of the recording paper, whereby the predicted non-operational time period T2 is established.

If the total time period of the non-operational time period T1 and the predicted non-operational time period T2 for the nozzle 51A measured at timing Tb in FIG. 9 exceeds the preliminary discharge time period Tng1 illustrated in FIG. 8, then at timing Tb in FIG. 9, a preliminary discharge is carried out.

Figure 10:
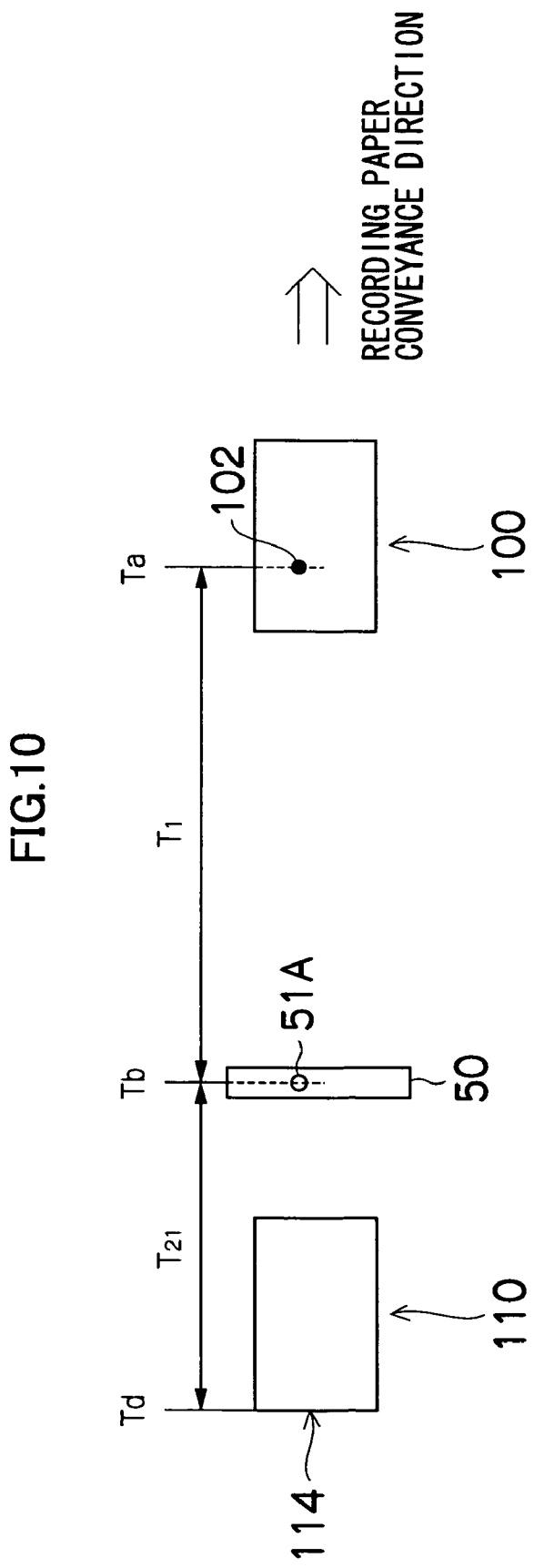
FIG. 10 is a diagram describing the timing of preliminary discharge control in a nozzle which is not operated.

FIG. 10 shows a case where the nozzle 51A is not to be operated (no droplets are to be ejected from the nozzle 51A,) in the next image 110.

In the next image 110, if the nozzle 51A is not to be operated, then the time period T21 from Tb until the print timing Td of the trailing end portion 114 of the next image 110 is calculated. If the sum total of the non-operational time period T1 (having the same definition as T1 described in FIG. 9) and the time period T21 from Tb until the timing Td of printing of the trailing end portion 114 of the next image 110, exceeds the value of Tng2 as illustrated in FIG. 8, then preliminary discharge is carried out at timing Tb in FIG. 9.

Figure 11:
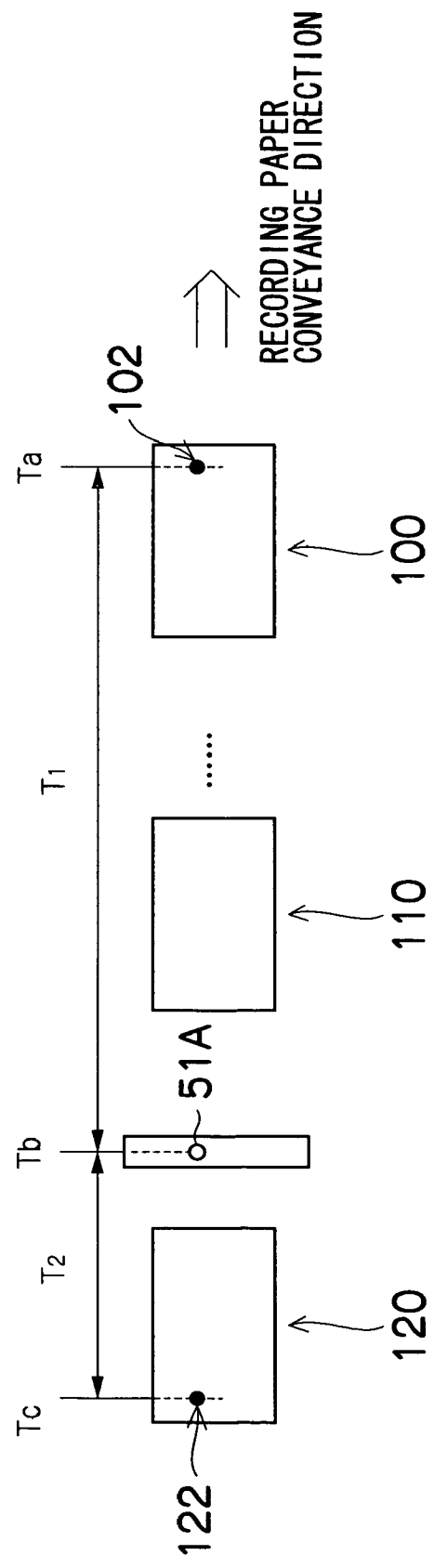
FIG. 11 is a diagram for describing the timing of preliminary discharge control in the case of printing a plurality of images.

Furthermore, if the nozzle 51A is not to be operated in the next image 110, and the total time period of the non-operational time period T1 and the time period T21 until printing of the trailing end portion 114 of the next image 110, without nozzle 51A being used in printing the next image 110, does not exceed Tng2, then as shown in FIG. 11, the calculation (storing) of non-operational time period T1 is continued. Moreover, if the nozzle 51A is to be operated (a droplet is to be deposited at droplet deposition point 122) in printing the next image 120, then non-operational time period T1 and predicted non-operational time period T2 are determined.

When carrying out preliminary discharge, preferably, the discharge pressure is set so as to be higher than in the case of normal discharge (normal printing). By raising the discharge pressure, it is possible to discharge ink of increased viscosity, in an efficient manner.

Figure 12:
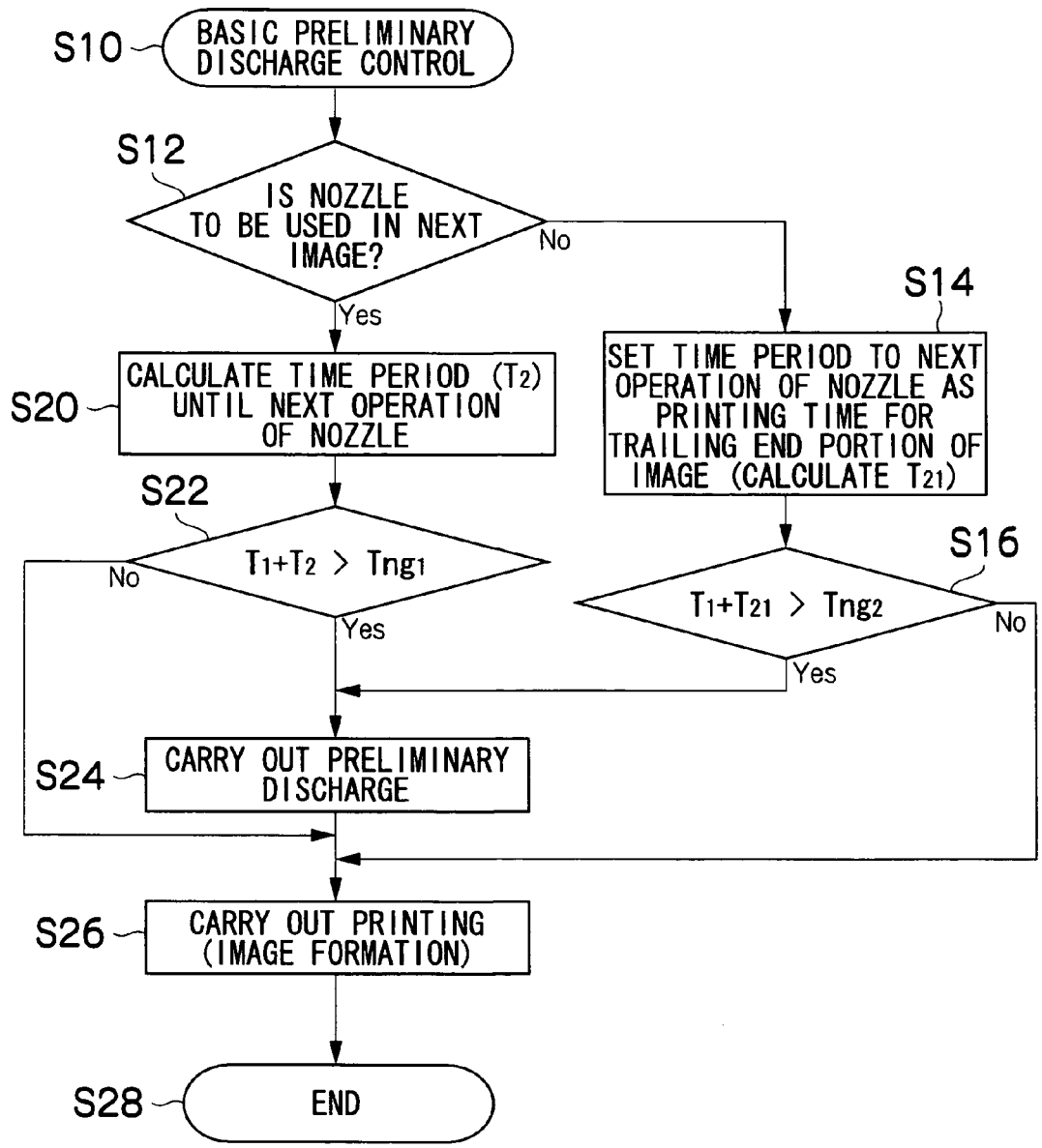
FIG. 12 is a flowchart showing the sequence of preliminary discharge control in the inkjet recording apparatus.

FIG. 12 is a flowchart showing the sequence of preliminary discharge control (normal preliminary discharge control) in the inkjet recording apparatus 10.

When printing is started (step S10), the procedure advances to step S12, where it is determined whether or not the nozzle 51A is to be used (operated) in the next image. If the nozzle 51A is not to be used in the next image (NO verdict), then the next nozzle operational time period is set as the time period until the trailing end portion of the image is printed, the time period T21 until printing of the trailing end portion of the image is calculated (step S14), and it is then judged whether or not the total time period of the non-operational time period T1 for the nozzle 51A, plus the time period T21 until printing of the trailing end portion of the image, exceeds the preliminary discharge reference time period Tng2 (step S16).

At step S16, if the total time period of the non-operational time period T1 plus the time period T21 until printing of the trailing end portion of the image does not exceed the value of Tng2 indicated in FIG. 8 (NO verdict), then printing (image formation) is carried out (step S26 in FIG. 12), whereas if the total time period of the non-operational time period T1 plus the time period T21 until printing of the trailing end portion of the image does exceed the value of the preliminary discharge reference time period Tng2 (YES verdict), then preliminary discharge is carried out (step S24).

If preliminary discharge is carried out at step S24, the non-operational time period T1 is reset (initialized) (namely, it is set to T1=0), and the procedure advances to step S26, wherein printing is carried out.

If the prescribed printing process has been carried out at step S26, the procedure advances to step S28, wherein preliminary discharge control terminates. If the nozzle in question is operated in this printing process, then T1 is reset.

On the other hand, at step S12, if nozzle 51A is to be used in the next image (YES verdict), then the time period until the nozzle 51A is next used (predicted non-operational time period) T2 is calculated (step S20), and it is judged whether or not the total time period of the non-operational time period T1 plus the predicted non-operational time period T2 for the nozzle 51A exceeds the value of Tng1 as shown in FIG. 8 (step S22 in FIG. 12).

At step S22, if the total time period of the non-operational time period T1 plus the predicted non-operational time period T2 for the nozzle 51A does not exceed Tng1 (NO verdict), then printing is carried out (step S26), whereas if the total time period of the non-operational time period T1 plus the predicted non-operational time period T2 for the nozzle 51A does exceed Tng1 (YES verdict), then the procedure advances to step S24, and preliminary discharge is carried out.

In the present embodiment, a case is described wherein the timing Tb is before the printing of the next image, but it is also possible for it to be before the start of printing of each batch. Moreover, in the case of a batch which involves a long printing time (a large-volume print operation, or the like), it can be judged whether or not to carry out preliminary discharge at a suitable timing during the batch.

As described above, the values of T1, T2 and T21 are managed independently for each nozzle, by the print controller 80 shown in FIG. 7, are stored as and when necessary in the nozzle management memory 92, and are compared with Tng1 and Tng2 by the preliminary discharge controller 94 to control preliminary discharge. Therefore, data is managed for each one of the nozzles in the head.

Figure 13:
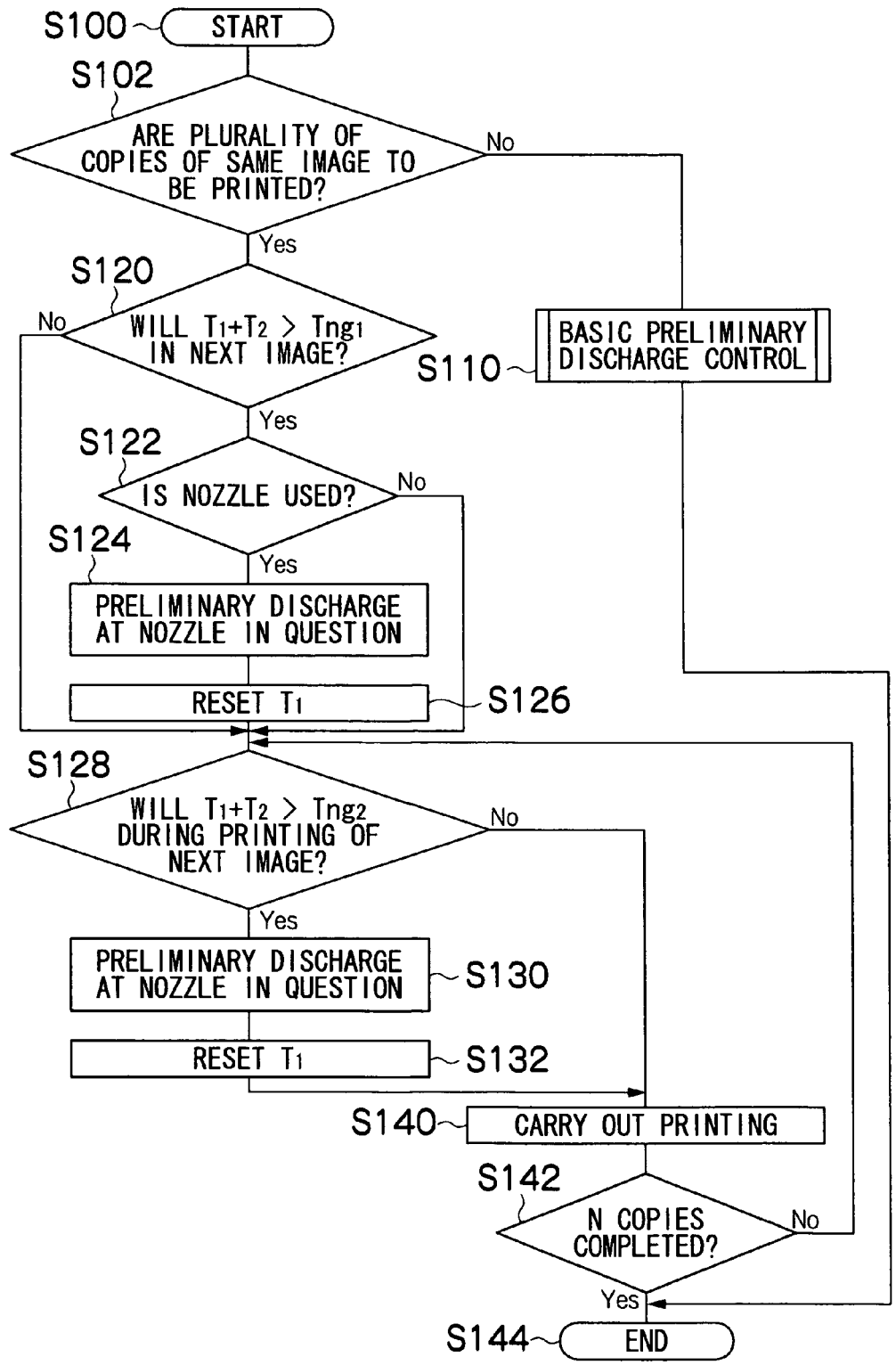
FIG. 13 is a flowchart showing the sequence of preliminary discharge control in the case of printing a plurality of images of the same content

Next, the control of preliminary discharge in the case of printing a plurality of images having the same content will be described with reference to FIG. 13. In FIG. 13, items which are the same as or similar to those in FIG. 12 are labeled with the same reference numerals and description thereof is omitted here.

When printing a plurality of copies of the same image, since the nozzles that are to be operated and the nozzles that are not to be operated are established, then in the nozzles that are operated, preliminary discharge is carried out with reference to Tng1 as illustrated in FIG. 8, and in the nozzles that are not operated, preliminary discharge is carried out if the time until the completion of the next image exceeds Tng2 illustrated in FIG. 8, thereby preventing complete discharge failure in the nozzles. When printing a plurality of copies of the same image, it may also happen that preliminary discharge is not carried out, depending on the length of the printed image and the number of copies printed.

When printing starts (step S100), the procedure advances to step S102, the total time period of the non-operational time period T1 plus the predicted non-operational time period T2 illustrated in FIG. 9 is calculated, and it is judged whether or not a plurality of copies of the same image are being printed.

If a plurality of copies of the same image are not to be printed (NO verdict), then the normal preliminary discharge control illustrated in FIG. 12 is carried out (step S110), and when the control in step S110 is terminated, then the procedure advances to step S144, and the preliminary discharge control is terminated.

Furthermore, in step S102, if it is judged that a plurality of copies of the same image are to be printed (YES verdict), then the procedure advances to step S120, the total time period of the non-operational time period T1 and the predicted non-operational time period T2 illustrated in FIG. 9 are calculated, and it is judged whether or not the total time period in the next image exceeds Tng1 as illustrated in FIG. 8.

At step S120 in FIG. 13, if it is judged that the total time period at the next image will not exceed, Tng1, then the procedure advances to step S128, and during printing, it is judged whether or not the total time period of the non-operational time period T1 and the predicted non-operational time period T2 exceed the value of Tng2 illustrated in FIG. 8.

At step S128, if the total time period does not exceed Tng2 (NO verdict), then printing is carried out (step S140), and the procedure advances to step S142, where it is judged whether or not printing of a prescribed number of copies (N copies) has been completed. If printing of N copies has not been completed (NO verdict), then the procedure advances to step S128, and if printing of N copies has been completed (YES verdict), then the preliminary discharge control is terminated (step S144).

On the other hand, if, at step S128, the total time period exceeds Tng2 (YES verdict), then preliminary discharge is carried out for the nozzle in question (step S130), and after resetting the value of non-operational time period T1 (step S132), the procedure advances to step S140.

At step S120, if it is judged that the total time period will exceed Tng1 in the next image, then the procedure advances to step S122, it is judged whether or not the nozzle in question is a nozzle that is to be operated (a nozzle in use). If at step S122, the nozzle is not a nozzle that is to be operated (NO verdict), then the procedure advances to step S128, and if it is a nozzle that is to be operated (YES verdict), then preliminary discharge of the nozzle is carried out (step S124), T1 is reset (step S126), and the procedure advances to step S128.

In the case of a print of long dimensions, or the like, preferably, control is performed in such a manner that there are no discharge abnormalities in operating nozzles, from the second print onwards.

In an inkjet recording apparatus 10 having a composition of this kind, the time period Tng1 until discharge abnormalities occur, and the time period Tng2 until discharge failures occur are provided as judgment reference time periods for judging whether or not to carry out preliminary discharge, and control is performed in such a manner that preliminary discharge is carried out on the basis of these judgment reference time periods. More specifically, since two time parameters until preliminary discharge is carried out are provided, then it is possible to prevent discharge abnormalities and discharge failures, and furthermore, the amount of ink consumed can be restricted.

Furthermore, for each nozzle, the non-operational time period T1 from the last time of operation, and the predicted non-operational time period T2 until the next time of operation, are calculated, and if the total time period of non-operational time period T1 plus predicted non-operational time period T2 exceeds Tng1, then preliminary discharge is carried out. In a nozzle that is not to be operated in the next image, the time period T21 until the trailing end portion of the image is printed is calculated, and if the total time period of the non-operational time period T1 plus the time period T21 until printing of the trailing end portion of the image exceeds Tng2, then preliminary discharge is carried out.

Before printing, it is judged whether or not the preliminary discharge limit time (the time period for which normal discharge can be achieved without performing preliminary discharge) will be exceeded during the next printing operation, and consequently, the occurrence of discharge abnormalities during printing can be prevented, while at the same time, nozzles that are not to be operated can be prevented from developing discharge failures.

The foregoing is an example wherein the non-operational time period T1, the predicted non-operational time period T2, and the time period T21 until printing of the trailing portion of the image, are controlled on an individual basis for each nozzle.

On the other hand, it is also possible to perform control in such a manner that a plurality of nozzles are treated as a single block. For example, a line head having 10,000 nozzles for each color is divided into 100 blocks, and preliminary discharge is controlled for the 100 nozzles in one block, together.

In this case, the non-operational time period T1 is counted up by taking as a reference the first timing at which one of the nozzles in the block in question was driven in the previous image. For the predicted non-operational time period T2, a predicted time period until the last time at which one of all the nozzles inside the block in question is to be driven, is input. Furthermore, if discharge prediction is not carried out for all the nozzles in the block in question, in the next image, then the time period T21 until printing the trailing end portion of the next time is used.

In this way, printing errors (droplet size errors, flight direction errors) are avoided by setting T1, T2 and T21 to the strictest conditions for each block, and hence the load on the control system and the memory can be reduced. Moreover, it is also possible to control preliminary discharge by setting T1, T2 and T21 to the strictest conditions with respect to the whole print head.

In the present embodiment, an example of control is illustrated wherein the judgment of whether or not to carry out preliminary discharge is made for each print (image), but it is also possible to implement control wherein the judgment of whether or not to carry out preliminary discharge is made respectively for each plurality of prints.

In the present embodiment, a full line type print head was described, but the scope of the present invention is not limited to this, and hence it may also be applied to a shuttle scanning type print head. Conventionally, in a shuttle scan type print head, preliminary discharge is performed in all of the nozzles, compulsorily, at fixed time intervals, but it is also possible to perform control by judging whether or not the preliminary discharge reference time period is to be exceeded before starting the next scan, in such a manner that preliminary discharge is carried out selectively, at certain nozzles only.

Furthermore, in the present embodiment, a piezo method using a piezoelectric element in order to discharge ink droplets was described, but the present invention may also be applied to a thermal type inkjet recording apparatus, wherein an energy generating body is provided in a pressure chamber, and ink is discharged by means of a bubble generated by heating the ink inside the pressure chamber, by means of an energy generating body.

Next, the pigment ink is described.

Production of Organic Pigment Fine-Particles and Dispersion Containing them

The apparatus for producing the organic pigment used in the embodiments of the present invention is one having a channel capable of forming laminar flow, preferably an apparatus having a channel with an equivalent diameter of 10 mm or smaller, and more preferably an apparatus having a channel with an equivalent diameter of 1 mm or smaller. First, the equivalent diameter is described below.

The equivalent diameter in the embodiments of the present invention is a term also called a corresponding diameter, which is used in mechanical engineering field. If a cylindrical pipe equivalent to the pipe (channel in the embodiments of the present invention) having any sectional shape is assumed, the diameter of the equivalent cylindrical pipe corresponds to the equivalent diameter. The equivalent diameter ($d_{eq}$) is defined as $d_{eq}=4A/p$, where A is a sectional area of the pipe, and p is a wetted perimeter length (circumferential length) of the pipe. In the case of the cylindrical pipe, this equivalent diameter corresponds to the diameter of the cylindrical pipe. The equivalent diameter is used for presuming fluidity or heat conducting characteristic of the pipe on the basis of data of the equivalent cylindrical pipe, and expresses a spatial scale (a representative length) of a phenomenon. The equivalent diameter is: $d_{eq}=4a^2/4a=a$ in a squared pipe having a side (a); $d_{eq}=a/\sqrt{3}$ in an equilateral triangular pipe having a side (a); and $d_{eq}=2h$ in a flow between paralleled plates having a channel height (h) (see, for example, edited by Nippon Kikai Gakkai, "Kikai Kougaku Jiten", 1997, published by Maruzen, K. K.).

When causing water to flow into a pipe, inserting a narrow pipe into the pipe along the central axis thereof and then injecting a colored solution into the water, the colored solution flows in the form of a single line while the flow velocity of the water is small or slow. Thus, the water flows straightly and in parallel to the wall of the pipe. However, when the flow velocity is raised to reach a given flow velocity, turbulence is suddenly caused in the water flow. Consequently, the colored solution is mixed with the water flow so that the whole of the solution and water becomes a colored flow. The former flow is called laminar flow, and the latter flow is called turbulent flow.

Whether a flow turns to a laminar flow or turbulent flow depends on whether or not the Reynolds number, which is a dimensionless number showing the state of the flow, is not more than a given critical value. As the Reynolds number is smaller, a laminar flow is more apt to be caused. The Reynolds number Re of the flow in a pipe is represented by the following equation:

$$Re=D<v_x>\rho/\mu,$$

where D is the equivalent diameter of the pipe, $<v_x>$ is the sectional average velocity, $\rho$ is the density of the flow, and $\mu$ is the viscosity of the flow. As can be understood from this equation, the Reynolds number is smaller as the equivalent diameter is smaller. Therefore, in the case that the equivalent diameter is in the order of micrometers, a stable laminar flow is apt to be formed. In addition, because the physical properties of the solution, such as the density and the viscosity thereof, also have influence on the Reynolds number. As the density is smaller and/or the viscosity is larger, the Reynolds number is smaller. It can be, therefore, understood that a laminar flow is apt to be formed in that case.

The Reynolds number representing such a critical value is called "critical Reynolds number". The critical Reynolds number is not necessarily definite. However, roughly, the following values are criteria:

Re<2,300 laminar flow;

Re>3,000 turbulent flow; and 3,000≧Re≧2,300 transition state.

As the equivalent diameter of a channel is smaller, the surface area per unit volume (specific surface area) thereof is larger. When the channel turns into a micro-scale, the specific surface area becomes remarkably large so that the conduction efficiency of heat through the wall of the channel becomes very high. Since the heat conduction time (t) of a fluid flowing in the channel is represented by: $t=d_{eq}^{2}/\alpha$ (where $\alpha$ is the heat diffusion rate of the fluid), the heat conduction time becomes shorter as the equivalent diameter becomes smaller. That is, if the equivalent diameter becomes 1/10, the heat conduction time becomes 1/100. Thus, when the equivalent diameter is in a micro-scale, the heat conduction speed is very high.

Precisely, in a micro-size space where the equivalent diameter is in micro scale, flow has a small Reynolds number, and thus, a flow reaction can be conducted with the laminar flow being preferential. In addition, the interface between laminar flows has a very large interface surface area. This enables high-speed and precise mixing of component molecules owing to molecular diffusion between laminar flows, with keeping laminar flows. Further, use can be made of a channel wall having a large surface area, which enables precise temperature control; and controlling the flow rate in flow reaction enables precise control of reaction time. Therefore, among the channels where the laminar flow can be formed according to the embodiments of the present invention, a channel of micro scale that has an equivalent diameter with which the reaction can be highly controlled is defined as a micro reaction site.

As shown in the above explanation of Reynolds number, formation of laminar flow is largely influenced not only by the size of equilibrium diameter of the channel but also by flowing conditions that include solution physical properties such as viscosity and density. Therefore, in the embodiments of the present invention, the equivalent diameter of the channel is not particularly limited as long as a laminar flow is formed in the channel. The equivalent diameter is preferably of a size with which a laminar flow easily forms. The equivalent diameter of the channel is preferably 10 mm or less, and it is more preferably 1 mm or less since a micro reaction site can be formed. The equivalent diameter is further preferably 10 μm to 1 mm, and particularly preferably 20 μm to 300 μm.

A typical example of the reaction apparatus (reactor) having such a micro-scale size flow path (channel), which can be particularly preferably used in the embodiments of the present invention, is commonly called "microreactor" and is being developed greatly in recent years (see, for example, W. Ehrfeld, V. Hessel, and H. Loewe, "Microreactor", 1st Ed. (2000) Wiley-VCH).

The above-mentioned general micro-reactor is provided with plural micro-channels each having an equivalent diameter (obtained by converting the section thereof to a corresponding circle) of several micrometers to several hundred micrometers; and a mixing space connected to these microchannels. In the micro-reactor, plural solutions are introduced through the plural micro-channels into the mixing space, thereby mixing the solutions, or mixing the solutions and simultaneously causing chemical reaction.

Next, the following describes major different points of reaction by use of the micro-reactor from reaction based on a batch type by use of a tank or the like. In chemical reaction of a liquid phase and chemical reaction in two liquid phases, molecules generally encounter each other on the interface between the reaction solutions, to cause the reaction. Therefore, when the reaction is conducted in a microscopic space (micro-channel), the area of the interface becomes large in relation to the space so that the efficiency of the reaction increases remarkably. In addition, about the diffusion of molecules, the diffusion time is in proportion with the square of diffusion distance. This fact means that as the scale is made smaller, the mixing of the reaction solutions advances more by the diffusion of the molecules, so as to cause the reaction more easily even if the reaction solutions are not actively mixed. Further, in the microscopic space, flows have small Reynolds numbers (dimensionless number by which the flow is characterized), the flows tend to turn preferentially to laminar flows. Therefore, the molecules existent in the solutions are exchanged from one laminar flow to another laminar flow on the interface where the solutions are in the states of laminar flows, and the transferred molecules cause precipitation or reaction.

When a micro-reactor, which has characteristics as described above, is used, the reaction time and temperature between the solutions therein can be more precisely controlled, compared with a conventional batch system, in which, for example, a tank having a large volume is used as a reaction site. Further, in the batch system, in particular, between solutions having a large reaction speed, sometimes reaction advances on a reaction contact face generated at the initial stage of mixing the solutions, and further a primary product generated by the reaction between the solutions subsequently undergoes reaction in the container. Therefore, there may be a possibility that the resultant product becomes non-homogeneous or crystals of the product grow beyond necessity in the mixing container (batch) to get coarse. Contrary to the above, according to a micro-reactor that can be used in the embodiments of the present invention, solutions hardly remain in the mixing space (e.g., a mixing container) so as to flow continuously. Consequently, it is possible to restrain a primary product generated by the reaction between the solutions from undergoing subsequent reaction while the primary product remains in the mixing space. Thus, a pure primary product, which has been hardly taken out hitherto, can be taken out. Moreover, it becomes difficult that crystals aggregate in the mixing space or get coarse.

Further, when a chemical substance that can be produced in only a small amount by use of an experimental producing-apparatus, is tried to produce in a large amount by use of large-scale manufacturing facilities (i.e., scaling up), huge labor and very long period of time have been required hitherto, to gain the reproducibility of the manufacture in large-scale manufacturing facilities of a batch system as similar as the reproducibility of the production in the experimental producing-apparatus. However, by arranging a plurality of producing lines each using a micro-reactor in parallel (numbering-up) according to a necessary production quantity, labor and time period for gaining such the reproducibility may be largely reduced.

The method for forming the channel of the laminar flow that can be used in the embodiments of the present invention will be explained. It is relatively easy to form a channel with a size of 1 mm or more with generally known micro machining techniques, while it is exceptionally difficult to form a channel with a size of 1 mm or less (micro size), especially with a size of 500 μm or less. A micro-size channel (microchannel) is formed on a solid substrate by micro processing technique in many cases. The material of the substrate may be any stable material that is not apt to be corroded. Examples of the material include metal (e.g., stainless steel, hastelloy (Ni—Fe based alloy), nickel, aluminum, silver, gold, platinum, tantalum, and titanium), glass, plastics, silicone, PTFE (polytetrafluoroethylene), and ceramics.

Representative examples of the micro processing technique for producing the micro-channel include a LIGA (Roentgentiefen-Lithographie, Galvanik und Abformung) method using X-ray lithography, a high aspect ratio photolithography method using EPON SU-8 (trade name), a micro discharge processing method (µ-EDM (micro electro discharge machining)), a high aspect ratio processing method for silicon by deep RIE (reactive ion etching), a hot emboss processing method, a photo-fabrication method, a laser processing method, an ion beam processing method, and a mechanical micro cutting method using a micro tool made of such a hard material as diamond. These techniques may be used alone or in combination. Preferable micro processing techniques are the LIGA method using X-ray lithography, the high-aspect ratio photolithography method using EPON SU-8, the micro discharge processing method (µ-EDM), and the mechanical micro cutting processing method. In recent years, investigations have been made for applying a micro-injection molding technique to engineering plastics.

When the micro-channel is assembled, a joining technique is often used. A normal joining technique is roughly divided into solid-phase joining and liquid-phase joining. In joining methods generally used, a typical joining method includes pressure welding and diffusion bonding as the solid-phase joining; and welding, eutectic bonding, soldering, and gluing as the liquid joining. Further, at the time of assembling, it is desirable to use a highly precise joining method in which dimension accuracy is maintained in such a way that deterioration of material due to high temperature heating, or destruction of a micro-structure such as a flow passage by a large deformation of material does not take place. Such a technique includes a silicon direct joining, anode joining, surface activation joining, direct joining using hydrogen bond, joining using aqueous HF solution, Au—Si eutectic bonding, and void-free bonding.

The micro-channels that can be used in the embodiments of the present invention are not limited to channels formed on a solid substrate by use of the micro processing technique, and may be, for example, various available fused silica capillary tubes each having an inner diameter of several micrometers to several hundred micrometers. Various silicon tubes, fluorocarbon resin tubes, stainless steel pipes, and PEEK (polyetheretherketone) pipes each having an inner diameter of several micrometers to several hundred micrometers, which are commercially available as parts for high-performance liquid chromatography or gas chromatography, can also be used.

Hitherto, with respect to micro-reactors, devices that are aimed to improve reaction efficiency and the like, have been reported. For example, Japanese Patent Application Publication Nos. 2003-210960, 2003-210963 and 2003-210959 are concerned with micro-mixers. In the embodiments of the present invention, these micro-devices may also be used.

The micro-channel that can be used in the embodiments of the present invention may be subjected to a surface treatment according to an object. In particular, when an aqueous solution is treated in the micro-channel, since the adsorption of the solute to the surface of glass or silicon may become a problem, the surface treatment is important. In the fluid control in the micro-sized flow passage, it is desirable to realize this without incorporating a movable part requiring a complicated manufacturing process. For example, a hydrophilic region and a hydrophobic region are prepared in the channel by the surface treatment, so that it becomes possible to treat a fluid by using a difference in surface tension exerting on the boundary between these regions. The method used for surface-treating glass or silicon in many cases is hydrophobic or hydrophilic surface-treatment by using a silane coupling agent.

In order to introduce a reagent, sample, or the like into the channels and mix, a fluid control function is needed. Specifically, since the behavior of the fluid in the micro-channel has properties different from those of a macro-scale, a control method appropriate for the micro-scale should be considered. A fluid control method is classified into a continuous flow system and a droplet (liquid plug) system according to the formation, while it is also classified into an electric driving system and a pressure driving system according to the driving force.

A more detailed description of these systems will be given hereinafter. The most widely used system as a formation for treating a fluid is the continuous flow system. When the flow is controlled in the continuous flow system, generally, the entire portion inside the micro-channel is filled with a fluid, and the fluid as a whole is driven by a pressure source such as a syringe pump that is provided outside the channel. In this method, although there is such a difficulty that dead volume is large, and the like, the continuous flow system has such a great merit that the control system can be realized with a relatively simple set-up.

As a system which is different from the continuous flow system, there is provided the droplet (liquid plug) system. In this system, droplets partitioned by air are made to move inside the reactor or inside the channel leading to the reactor, and each of the droplets is driven by air pressure. During this process, a vent structure for allowing air between droplets and channel walls, or air between the droplets, to escape to the outside as necessary; a valve structure for maintaining pressure inside the branched channels independently from pressure at other portions; and the like, must be provided inside the reactor system. Further, a pressure control system that is formed by a pressure source or a switching valve must be provided outside the reactor system in order to move the droplets by controlling the pressure difference. Thus, in the liquid droplet system, although the apparatus configuration and the structure of the reactor become rather complicated as stated above, a multi-stage operation is enabled, for example, plural droplets are individually operated and some reactions are sequentially performed, and the degree of freedom concerning the system configuration becomes high.

As the driving system for performing the fluid control, there are generally and widely used an electrical driving method in which a high voltage is applied between both ends of a flow passage (channel) to generate an electro-osmotic flow, thereby fluid is moved; and a pressure driving method in which a pressure is applied to a fluid to move the fluid using a pressure source provided at the outside of the passage. It has been known that both systems are different in that, for example, as the behavior of the fluid, the flow velocity profile in the cross-section of the flow passage becomes a flat distribution in the case of the electrical driving system, whereas it becomes a hyperbolic flow distribution in the pressure driving system, in which the flow velocity is high at the center of the flow passage and low at the wall surface part. Therefore, the electrical driving system is suitable for such an object that a movement is made while the shape of a sample plug or the like is kept. In the case where the electrical driving system is performed, since it is necessary that the inside of the flow passage is filled with the fluid, the form of the continuous flow system must be adopted. However, since the fluid can be treated by an electrical control, a comparatively complicated process is also realized, for example, a concentration gradient varying with time is formed by continuously changing the mixing ratio of two kinds of solutions. In the case of the pressure driving system, the control can be made irrespective of electrical properties of the fluid, and secondary effects such as heat generation or electrolysis may not be considered, and therefore, an influence on the substrate (component) hardly exists, and its application range is wide. On the contrary, a pressure source must be prepared outside, and it is necessary to automate the complicated process while considering that, for example, response characteristics to manipulation are changed according to the magnitude of a dead volume of a pressure system.

In the embodiments of the present invention, although a method to be used as a fluid control method is suitably selected according to its object, the pressure driving system of the continuous flow system is preferable.

The temperature control of the channel for use in the embodiments of the present invention may be performed by putting the whole device having a passage in a container in which the temperature is controlled; or forming a heater structure such as a metal resistance wire or polysilicon in the device, and performing a thermal cycle in such a manner that the heater structure is used when heating, and cooling is natural cooling. With respect to the sensing of temperature, when a metal resistance wire is used, it is preferable that the same resistance wire as the heater is additionally formed, and the temperature measurement is performed on the basis of the change of the resistance value of the additional wire. When the polysilicon is used, it is preferable that a thermocouple is used to measure the temperature. Further, heating and cooling may be performed from the outside by bringing a Peltier element into contact with the channel. A suitable method is selected in accordance with the use, the material of the channel body, and the like.

In the embodiments of the present invention, the production of the pigment or the preparation of the pigment dispersion is performed while flowing the solutions in a channel(s), that is, by a continuous flowing method. Thus, the reaction time is controlled by a time during which the channel retains the flow (i.e., retention time). When the equivalent diameter is constant, the retention time is determined by the length of the channel and the induction speeds of the reaction solutions. Further, the length of the channel is not particularly limited, but it is preferably 1 mm or more but 10 m or less, more preferably 5 mm or more but 10 m or less, and particularly preferably 10 mm or more but 5 m or less.

The number of channels that can be used in the embodiments of the present invention may be any number appropriately provided with a reactor. The number of channels may be one. Alternately, many channels may be arranged in parallel (i.e., numbering-up) as needed, to increase a processing amount thereof.

Typical examples of a reactor that can be used in the embodiments of the present invention are illustrated in FIGS. 14A to 17. Needless to say, the present invention is not limited to these examples.

Figure 14A:
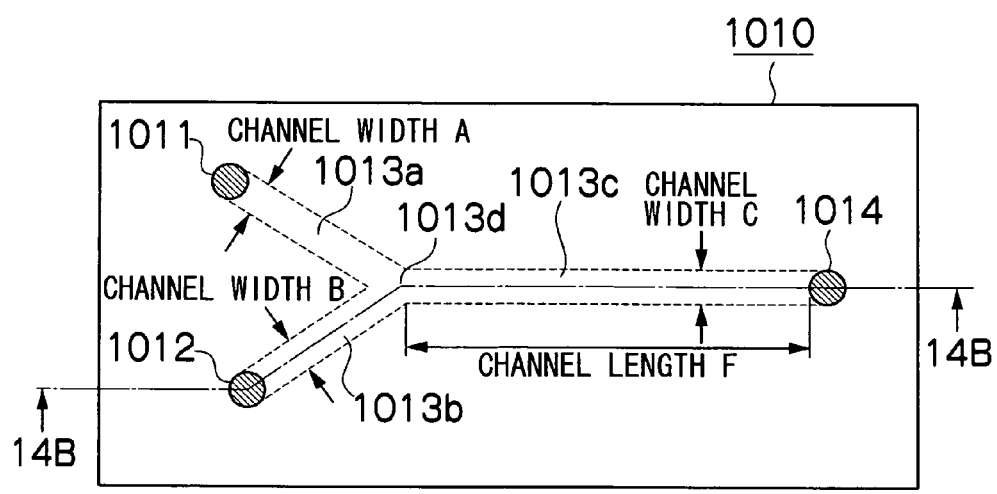
FIG. 14A is an explanatory view of a reactor having on one side thereof a Y-shaped channel.
Figure 14B:
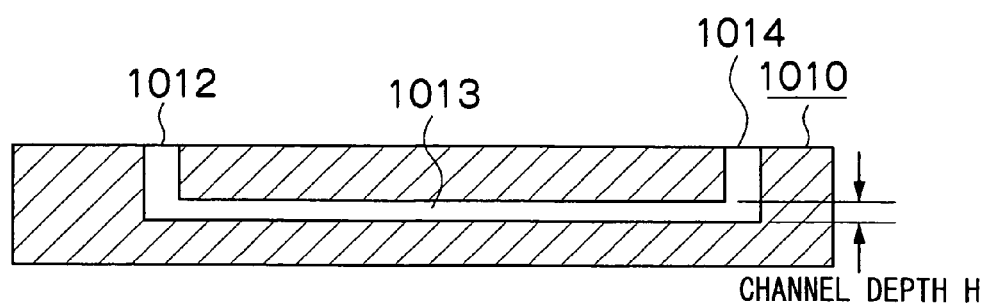
FIG. 14B is a sectional view along the line 14B-14B in FIG. 14A.

FIG. 14A is an explanatory view of a reactor 1010 having a Y-shaped channel. FIG. 14B is a sectional view of the reactor taken on line 14B-14B in FIG. 14A. The shape of the section perpendicular to the direction of the length of the channel is varied dependently on the micro processing technique to be used, and is a shape close to a trapezoid or a rectangle. When widths and depths (in particular, the width C and the depth H) of the Y-shaped channel are made into micro-sizes, solutions introduced from introducing ports 1011 and 1012 with pumps or the like are caused to flow via introducing channels 1013a and 1013b, respectively, and are brought into contact with each other at a fluid confluence point 1013d to form stable laminar flows to flow through a reaction channel 1013c. While the solutions flow as the laminar flows, a solute contained in a laminar flow is mixed or reacted with another solute contained in another laminar flow by molecular diffusion on the interface between the laminar flows. Solutes, which diffuse very slowly, may not be diffused or mixed between the laminar flows; and, in some cases, the solutes are not mixed until they reach a discharge port 1014. In such a case that the two introduced solutions are easily mixed in a flask, the flow of the mixed solutions may become homogeneous flow in the discharge port if the channel length F is made long. However, when the channel length F is short, laminar flows are kept up to the discharge port. When the two introduced solutions are not mixed in a flask and are separated into phases, the two solutions naturally flow as laminar flows to reach the discharge port 1014.

Figure 15A:
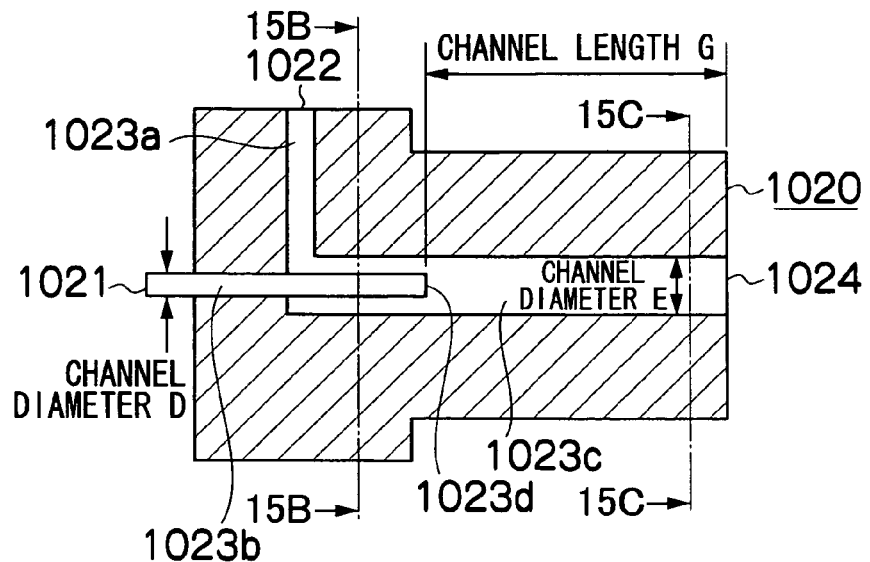
FIG. 15A is an explanatory view of a reactor having a cylindrical tube-type channel in which a channel is provided to insert at one side thereof.
Figure 15B:
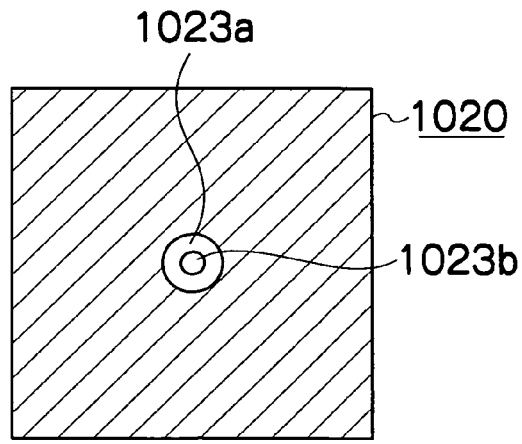
FIG. 15B is a sectional view along the line 15B-15B in FIG. 15A.
Figure 15C:
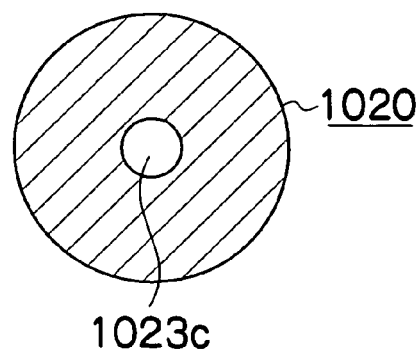
FIG. 15C is a sectional view along the line 15C-15C in FIG. 15A.

FIG. 15A is an explanatory view of a reactor 1020 having a cylindrical pipe-type channel in which a channel is inserted at one side thereof. FIG. 15B is a sectional view of the reactor taken on line 15B-15B in FIG. 15A, and FIG. 15C is a sectional view of the reactor taken on line 15C-15C in FIG. 15A. The shape of the section perpendicular to the lengthwise direction of the channel is a circular shape or a shape close thereto. When the channel diameters D and E of the cylindrical pipes are micro-sizes, solutions introduced from introducing ports 1021 and 1022 with pumps or the like are caused to flow via introducing channels 1023b and 1023a, respectively, and are brought into contact with each other at a fluid confluence point 1023d to form stable cylindrical laminar flows to flow through a reaction channel 1023c. While the solutions flow as the cylindrical laminar flows, solutes contained in the separate laminar flows are mixed or reacted with each other by molecular diffusion on the interface between the laminar flows. This matter is the same as in the case of the reactor shown in FIG. 14A. The apparatus having the cylindrical pipe-type channel has the following characteristics: that the apparatus can make the contact interface between the two solutions larger than the apparatus shown in FIG. 14A; and since the contact interface has no portion to contact the wall face of the apparatus, it does not happen that crystal growth is caused from the contact portion with the wall face as in the case that a solid (crystal) is generated by reaction, thereby the apparatus gives only a low possibility that the channel is blocked.

Figure 16A:
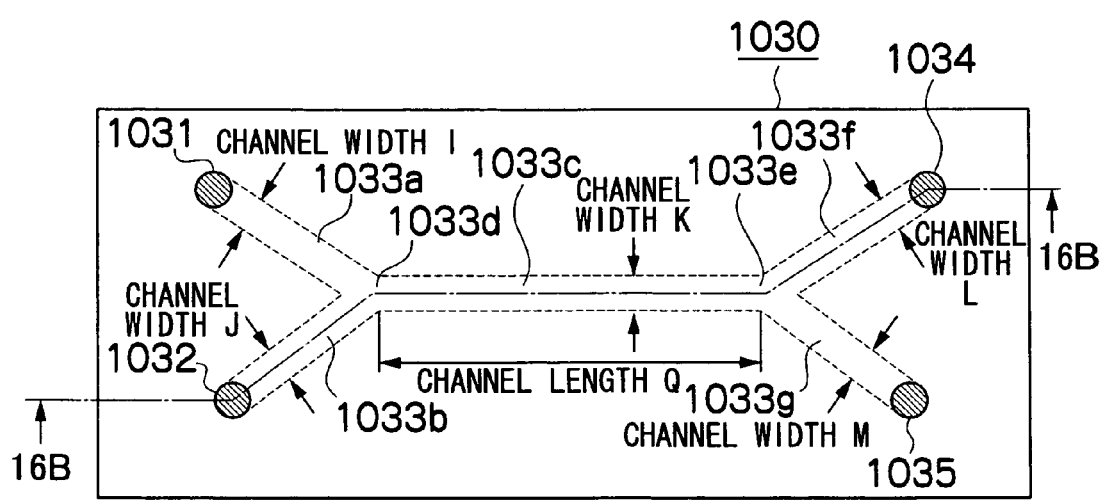
FIG. 16A is an explanatory view of a reactor having on both sides thereof Y-shaped channels.
Figure 16B:
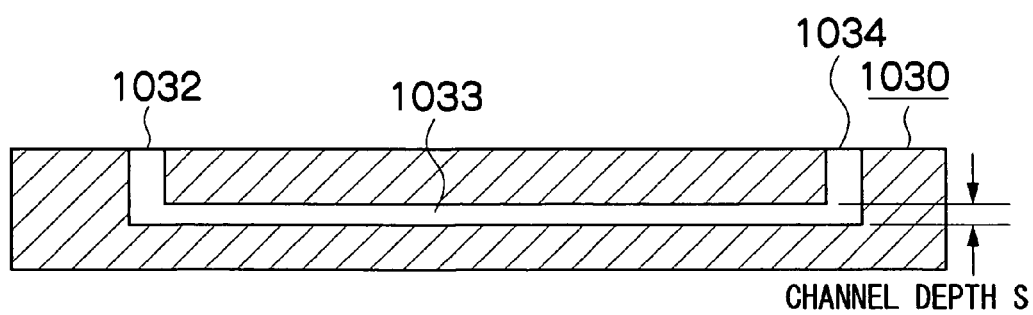
FIG. 16B is a sectional view along the line 16B-16B in FIG. 16A.
Figure 17:
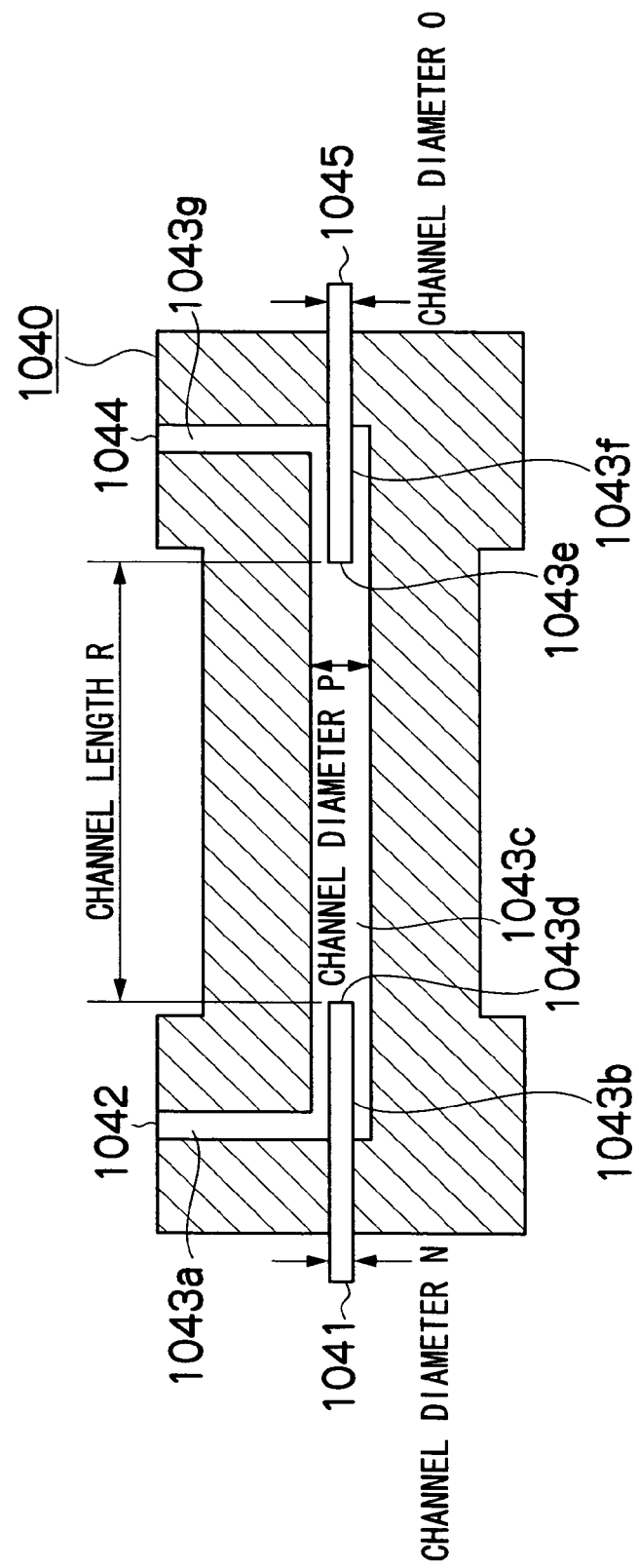
FIG. 17 is an explanatory view of a reactor having a cylindrical tube-type channel in which channels are provided to insert at both sides thereof.

FIGS. 16A and 17 are explanatory views of reactors 1030 and 1040 obtained by improving the reactors illustrated in FIGS. 14A and 15A, respectively, in order that when flows of two solutions arrive at outlets in the state that the flows are laminar flows, the laminar flows can be separated from each other. FIG. 16B is a sectional view of the reactor 1030 taken on line 16B-16B in FIG. 16A. When these apparatuses are used, reaction and separation can be attained at the same time. It is also possible to avoid phenomena that the two solutions are finally mixed so that the reaction between the solutions advances excessively, and that generated crystals get coarse. In the case that products or crystals are selectively present in one of the solutions, the products or crystals can be obtained with a higher concentration than in the case that the two solutions are mixed. Further, by linking a plurality of the apparatuses sequentially, there are such advantages that an extracting operation is effectively performed.

(1) Production of Dispersion Containing Organic Pigment Fine-Particles by Micro-Reactor In the embodiments of the present invention, a solution in which an organic pigment is homogeneously dissolved in an alkaline or acidic aqueous medium, is caused to flow, as a laminar flow, through the channel as described above, and in the course of this step of laminar flowing, the hydrogen ion exponent (pH) of the solution is changed, thereby producing organic pigment fine-particles and a dispersion containing the fine-particles. This is described in detail hereinafter.

The organic pigment produced in the embodiments of the present invention is not limited in the color tone thereof, and it may be a magenta pigment, a yellow pigment, or a cyan pigment. Specifically, the organic pigment may be a magenta pigment, a yellow pigment or a cyan pigment of a perylene-, perynone-, quinacridone-, quinacridonequinone-, anthraquinone-, anthanthrone-, benzimidazolone-, disazo-condensation-, disazo-, azo-, indanthrone-, phthalocyanine-, triaryl-carbonium-, dioxazine-, aminoanthraquinone-, diketopyrrolopyrrole-, thioindigo-, isoindoline-, isoindolinone-, pyranthrone- or isoviolanthrone-series pigments, or a mixture thereof.

Preferred pigments are quinacridone-, diketopyrrolopyrrole-, disazo-condensation- or phthalocyanine-series pigments; and particularly preferred pigments are quinacridone-, disazo-condensation-, or phthalocyanine-series pigments.

In the embodiments of the present invention, two or more kinds of the organic pigments or a solid solution of the organic pigments, or a combination of the organic pigment with an inorganic pigment may be used.

It is necessary that the organic pigment is homogeneously dissolved in an alkaline or acidic aqueous medium. It depends on the nature of the pigment whether the organic pigment in interest may be more easily dissolved homogeneously under either alkaline or acidic, to select the conditions in which the organic pigment be dissolved under alkaline or dissolved under acidic. In general, in the case of the pigment having in the molecule thereof a group dissociative under alkaline, the alkaline medium is used, and in the case of the pigment having no group dissociative under alkaline and having in the molecule thereof many nitrogen atoms to which protons are easily added, the acidic medium is used. For example, quinacridone-, diketopyrrolopyrrole-, and disazo-condensation-series pigments are dissolved in the alkaline medium, and phthalocyanine-series pigments are dissolved in the acidic medium.

Examples of a base that can be used in the case that the pigment is dissolved in an alkaline aqueous medium, include inorganic bases, such as sodium hydroxide, calcium hydroxide, and barium hydroxide; and organic bases, such as trialkylamine, diazabicycloundecene (DBU), and metal alkoxides. Among these, the inorganic bases are preferable.

The amount of the base to be used is not particularly limited, as long as the base in the amount can make the pigment be dissolved homogeneously. In the case of the inorganic base, the amount thereof is preferably from 1.0 to 30 mole equivalents, more preferably from 2.0 to 25 mole equivalents, and further preferably from 3 to 20 mole equivalents, to the pigment. In the case of the organic base, the amount thereof is preferably from 1.0 to 100 mole equivalents, more preferably from 5.0 to 100 mole equivalents, and further preferably from 20 to 100 mole equivalents, to the pigment.

Examples of an acid that can be used in the case that the pigment is dissolved in an acidic aqueous medium, include inorganic acids, such as sulfuric acid, hydrochloric acid, and phosphoric acid; and organic acids, such as acetic acid, trifluoroacetic acid, oxalic acid, methanesulfonic acid, and trifluoromethanesulfonic acid. Among these, the inorganic acids are preferable, and sulfuric acid is especially preferable.

The amount of the acid to be used is not particularly limited, as long as the acid in the amount can make the pigment be dissolved homogeneously. In many cases, the acid is used in a larger or more excessive amount than the base. Regardless the kind of the acid being an inorganic acid or an organic acid, the amount of the acid to be used is preferably from 3 to 500 mole equivalents, more preferably from 10 to 500 mole equivalents, and further preferably from 30 to 200 mole equivalents, to the pigment.

The following describes the aqueous medium. The aqueous medium in the embodiments of the present invention is water alone, or a mixed solvent with an organic solvent soluble in (or miscible with) water. The addition of the organic solvent is performed in the case that, according to use of only water, it is impossible to homogeneously dissolve the pigment or a dispersing agent, or it is impossible to obtain a viscosity necessary for flow in the channel, and in the case necessary for forming laminar flow. Thus, the addition of the water-soluble organic solvent is not essential, but is performed in many cases. Examples of the organic solvent to be added include polyhydric-alcohol-series solvents, typified, for example, by ethylene glycol, propylene glycol, diethylene glycol, polyethylene glycol, thiodiglycol, dithiodiglycol, 2-methyl-1,3-propanediol, 1,2,6-hexanetriol, acetylene glycol derivatives, glycerin, and trimethylolpropane; lower monoalkyl ether of a polyhydric alcohol series solvents, such as ethylene glycol monomethyl(or monoethyl) ether, diethylene glycol monomethyl (or monoethyl)ether, and triethylene glycol monoethyl(or monobutyl)ether; polyether-series solvents, such as ethylene glycol dimethyl ether (monoglyme), diethylene glycol dimethyl ether (diglyme), and triehtylene glycol dimethyl ether (triglyme); amide-series solvents, such as dimethylformamide, dimethylacetamide, 2-pyrrolidone, N-methyl-2-pyrrolidone, 1,3-dimethyl-2-imidazolidinone, urea, and tetramethyl urea; sulfur-containing solvents, such as sulfolane, dimethylsulfoxide, and 3-sulfolene; polyfunctional solvents, such as diacetone alcohol, and diethanolamine; carboxylic-acid-series solvents, such as acetic acid, maleic acid, docosahexaenoic acid, trichloroacetic acid, and trifluoroacetic acid; and sulfonic-acid-series solvents, such as methanesulfonic acid, and trifluorosulfonic acid. These solvents may be mixed in combination with two or more thereof, and used.

The organic solvent is preferably an amide-series solvent or a sulfur-containing solvent in the case of alkaline, and a carboxylic-acid-series solvent, a sulfur-containing solvent or a sulfonic-acid-series solvent in the case of acidic; more preferably the sulfur-containing-series solvent in the case of alkaline, and a sulfonic-acid-series solvent in the case of acidic; and particularly preferably dimethylsulfoxide (DMSO) in the case of alkaline, and methanesulfonic acid in the case of acidic.

The blend ratio of water to the organic solvent is not particularly limited, as long as at the ratio it is possible to dissolve the pigment to be used homogeneously. The blend ratio of water to the organic solvent is preferably from 0.05 to 10 (mass ratio) in the alkaline aqueous medium. In the case that an inorganic acid is used in the acidic aqueous medium, it is preferable to use, for example, sulfuric acid alone without using any organic solvent. When an organic acid(s) is used, the organic acid itself is an organic solvent, and a plurality of acids are mixed or water is added thereto in order to adjust the viscosity and the solubility of the aqueous medium. Preferably, the mass ratio of water to the organic solvent(s) (organic acid(s)) is from 0.005 to 0.1.

In the embodiments of the present invention, it is preferred to introduce into the channel a solution homogeneously dissolving an organic pigment(s) or a material(s) therefor. When a suspension is introduced into the channel, the size of the particles therein becomes large or pigment fine-particles having a wide particle size distribution are generated. This results, as the case may be, to be apt to block the channel. The wording "homogeneously dissolving" means a solution in which turbidity (muddiness) is hardly observed when the solution is observed under visible light. In the embodiments of the present invention, a solution obtained by filtration through a micro-filter having no pores larger than 1 µm in diameter, or a solution which does not contain any substance removed by the action of a filter having pores of 1 µm or less in diameter, is defined as a homogeneously dissolved solution (or a homogeneous solution).

The following describes the hydrogen ion exponent (pH). The hydrogen ion exponent (pH) is the common logarithm of the reciprocal number of a hydrogen ion concentration (molar concentration), and may be called the hydrogen exponent. The hydrogen ion concentration is the concentration of hydrogen ions $H^+$ in a solution, and means the mole number of hydrogen ion present in a 1-liter solution. Since the hydrogen ion concentration changes in a very wide range, it is usually represented by the hydrogen ion exponent (pH). For example, a 1-liter pure water contains $10^{-7}$ mol of hydrogen ions at 1 atmosphere and 25° C. Thus, the pH thereof is 7, which is neutral. The aqueous solution having a pH of less than 7 is acidic, and the aqueous solution having a pH of more than 7 is alkaline. As a method of measuring the pH value, there are potentiometric and calorimetric measuring methods.

In the embodiments of the present invention, the hydrogen ion exponent (pH) is changed in the step of causing the solution to flow in a channel, thereby producing pigment fine particles. This process is performed using a channel having an introducing port different from an introducing port for the homogeneous solution of the organic pigment, for example, a channel having at least two introducing ports as illustrated in FIG. 14A or 15A. Specifically, a homogeneous solution of an organic pigment is introduced into the introducing port 1011 in FIG. 14A or the introducing port 1021 in FIG. 15A, and neutral, acidic or alkaline water or an aqueous solution in which a dispersing agent is dissolved is introduced into the introducing port 1012 in FIG. 14A or the introducing port 1022 in FIG. 15A. The two solutions are brought into contact with each other in the channel 1013c or 1023c, thereby changing the hydrogen ion concentration, that is, the hydrogen ion exponent (pH), of the solution containing the organic pigment toward neutrality (pH 7). In the case that the equivalent diameter of the channel is in a micro-scale, any flow therein has a small Reynolds number. Consequently, stable laminar flows (cylindrical laminar flows in FIG. 15A) are formed, and water and ions diffuse and transfer through a stable interface between the two flows so that the hydrogen ion exponent (pH) of the solution containing the organic pigment is gradually changed toward neutrality. The pigment is not easily dissolved in an aqueous medium at a low alkalinity or a low acidity, therefore, as the hydrogen ion exponent (pH) of the solution containing the organic pigment is changed toward neutrality, pigment fine particles are gradually precipitated.

In the case that pigment fine particles are produced from a pigment dissolved in an alkaline aqueous medium, the change of the hydrogen ion exponent (pH) is generally performed within the range of 16.0 to 5.0, preferably 16.0 to 10.0. In the case that pigment fine particles are produced from a pigment dissolved in an acidic aqueous medium, the change of the hydrogen ion exponent (pH) is generally performed within the range of 1.5 to 9.0, preferably 1.5 to 4.0. The range of the change depends on the value of the hydrogen ion exponent (pH) of the organic pigment solution, but the range may be a range sufficient for promoting the precipitation of the organic pigment.

The pigment fine particles generated in the channel of a micro-scale do flow into an outlet in the state that the particles are contained in one of the laminar flows, without diffusing. Therefore, when a channel apparatus having outlets designed, as illustrated in FIG. 16A or 17, is used, the laminar flow containing the organic pigment fine-particles can be separated. When this method is used, a high-concentration pigment dispersion can be obtained, and simultaneously the water-soluble organic solvent, the alkaline or acidic water, and an excessive of the dispersing agent used to prepare the homogeneous solution can be removed. Thus, this process is advantageous. It is also possible to avoid the following: that the two solutions are finally mixed so that pigment crystals get coarse or deteriorate.

When pigment fine particles are produced, the reaction temperature inside the channel is preferably within such a range that the solvent is not solidified or vaporized, and it is preferably from −20 to 90° C., more preferably from 0 to 50° C., and particularly preferably from 5 to 15° C.

When pigment fine particles are produced, the flow velocity (flow rate) of the fluid which flows in the channel is advantageously from 0.1 mL/hour to 300 L/hour, preferably from 0.2 mL/hour to 30 L/hour, more preferably from 0.5 mL/hour to 15 L/hour, and particularly preferably from 1.0 mL/hour to 6 L/hour.

In the embodiments of the present invention, the concentration of a substrate (such as an organic pigment or a reaction component thereof) which flows in the channel, is generally in the range of 0.5 to 20 wt %, preferably in the range of 1.0 to 10 wt %.

In the method of the embodiments of the present invention for producing organic pigment fine-particles, a dispersing agent can be incorporated into the solution containing an organic pigment and/or an aqueous solution (aqueous medium) for changing the hydrogen ion exponent (pH). The dispersing agent has functions: (1) that the dispersing agent is rapidly adsorbed on the surface of the precipitated pigment, to form fine pigment particles, and (2) that these particles are prevented from aggregating again. In the embodiments of the present invention, as the dispersing agent, use can be made of an anionic, cationic, amphoteric, nonionic or pigmentary and low-molecular-weight or polymer dispersing agent. These dispersing agents may be used alone or in combination. Dispersing agents to be used in dispersion of the pigment are described in detail in "Dispersion Stabilization of Pigment and Surface Treatment Technique/Evaluation" (published by Japan Association for International Chemical Information, on December 2001), pp. 29-46.

Examples of the anionic dispersing agent (anionic surfactant) include N-acyl-N-alkyltaurine salts, fatty acid salts, alkylsulfates, alkylbenzenesulfonates, alkylnaphthalenesulfonates, dialkylsulfosuccinates, alkylphosphates, naphthalenesulfonic acid/formalin condensates, and polyoxyethylenealkylsulfates. N-acyl-N-alkyltaurine salts are particularly preferable. As the N-acyl-N-alkyltaurine salts, those described in Japanese Patent Application Publication No. 3-273067 are preferable. These anionic dispersing agents may be used alone or in combination of two or more thereof.

Examples of the cationic dispersing agent (cationic surfactant) include quaternary ammonium salts, alkoxylated polyamines, aliphatic amine polyglycol ethers, aliphatic amines, diamines and polyamines derived from aliphatic amine and aliphatic alcohol, imidazolines derived from aliphatic acid, and salts of these cationic substances. These cationic dispersing agents may be used alone or in combination of two or more thereof.

The amphoteric dispersing agent is a dispersing agent having, in the molecule thereof, an anionic group moiety which the anionic dispersing agent has in the molecule, and a cationic group moiety which the cationic dispersing agent has in the molecule.

Examples of the nonionic dispersing agents (nonionic surfactant) include polyoxyethylenealkyl ethers, polyoxyethylenealkylaryl ethers, polyoxyethylene fatty acid esters, sorbitan fatty acid esters, polyoxyethylenesorbitan fatty acid esters, polyoxyethylenealkylamines, and glycerin fatty acid esters. Among these, polyoxyethylenealkylaryl ethers are preferable. These nonionic dispersing agents may be used alone or in combination of two or more thereof.

The pigmentary dispersing agent is defined as a dispersing agent derived from an organic pigment as a parent material, and prepared by chemically modifying a structure of the parent material. Examples of the pigmentary dispersing agent include sugar-containing pigmentary dispersing agents, piperidyl-containing pigmentary dispersing agents, naphthalene- or perylene-derivative pigmentary dispersing agents, pigmentary dispersing agents having a functional group linked through a methylene group to a pigment parent structure, pigmentary dispersing agents (parent structure) chemically modified with a polymer, pigmentary dispersing agents having a sulfonic acid group, pigmentary dispersing agents having a sulfonamido group, pigmentary dispersing agents having an ether group, and pigmentary dispersing agents having a carboxylic acid group, carboxylic acid ester group or carboxamido group.

Specific examples of the polymer dispersing agent include polyvinyl pyrrolidone, polyvinyl alcohol, polyvinyl methyl ether, polyethylene oxide, polyethylene glycol, polypropylene glycol, polyacrylamide, vinyl alcohol/vinyl acetate copolymer, partial-formal products of polyvinyl alcohol, partial-butyral products of polyvinyl alcohol, vinylpyrrolidone/vinyl acetate copolymer, polyethylene oxide/propylene oxide block copolymer, polyacrylic acid salts, polyvinyl sulfuric acid salts, poly(4-vinylpyridine) salts, polyamides, polyallylamine salts, condensed naphthalenesulfonic acid salts, styrene/acrylic acid salt copolymers, styrene/methacrylic acid salt copolymers, acrylic acid ester/acrylic acid salt copolymers, acrylic acid ester/methacrylic acid salt copolymers, methacrylic acid ester/acrylic acid salt copolymers, methacrylic acid ester/methacrylic acid salt copolymers, styrene/itaconic acid salt copolymers, itaconic acid ester/itaconic acid salt copolymers, vinylnaphthalene/acrylic acid salt copolymers, vinylnaphthalene/methacrylic acid salt copolymers, vinylnaphthalene/itaconic acid salt copolymers, cellulose derivatives, and starch derivatives. Besides, natural polymers can be used, examples of which include alginic acid salts, gelatin, albumin, casein, gum arabic, gum tragacanth, and ligninsulfonic acid salts. Polyvinyl pyrrolidone is particularly preferable. These polymer dispersing agents may be used alone or in combination of two or more thereof.

Examples of a preferred embodiment include an embodiment in which the anionic dispersing agent is incorporated in the aqueous medium, and the nonionic dispersing agent and/or the polymer dispersing agent are(is) incorporated in the solution in which the organic pigment is dissolved.

The amount of the dispersing agent to be blended is preferably from 0.1 to 1,000 parts by mass, more preferably from 1 to 500 parts by mass, and further preferably from 10 to 250 parts by mass, to 100 parts by mass of the pigment, in order to further improve the uniform dispersibility and storage stability of the pigment. If the amount of the dispersing agent to be added is less than 0.1 parts by mass, the dispersion stability of the organic pigment fine particles may not be improved, in some cases.

The dispersion containing the organic pigment fine-particles produced as described above can be used by itself as pigment ink, and it can be used with various additives. Examples of the additive include drying preventives (humectants), color-fading preventives, emulsion-stabilizing agents, penetrating accelerants, ultraviolet absorbents, preservatives, mold preventives, pH adjustive agents, surface tension adjustive agents, defoamants, viscosity adjustive agents, dispersants, dispersion-stabilizing agents, rust preventives, and chelating agents.

(2) Measurement of Produced Organic Pigment Fine-Particle in Particle Size

In the measuring method of fine particles, the average size of the group of the particles can be expressed by a numerical value. Examples of the numerical value which is widely used, include mode diameter, which shows the maximum value of the particle size distribution; medium diameter, which corresponds to the central value of the integration distribution curve thereof; and various average diameters (such as length average, area average, and weight average). The particle diameter size of the organic pigment fine-particles produced by the method of the embodiments of the present invention is arbitrary as far as the channel is not blocked. The particle diameter size is preferably 1 μm or less, more preferably from 3 nm to 800 nm, and particularly preferably from 5 nm to 500 nm in terms of the mode diameter.

Having a uniform particle size of fine-particles, i.e., having a monodisperse fine-particle system, is an important factor that affects performances of the particles, since not only it means that the particles included therein have uniform diameters but also it means that there is no fluctuation among particles in chemical composition and crystal structure inside the particles. In particular, this factor is regarded as important that governs the characteristics of the particles, in ultrafine-particles having nanometer order particle sizes. The method of the embodiments of the present invention is excellent not only it can control the size of particles but also it can obtain particles of uniform sizes. The arithmetic standard deviation is used as an index of having a uniform size. The arithmetic standard deviation of the pigment fine-particles produced according to the embodiments of the present invention is preferably 130 nm or less, particularly preferably 80 nm or less. The arithmetic standard deviation is obtained by subtracting the 16% particle diameter from the 84% particle diameter in the integrated distribution, and further dividing this difference by 2, in a method obtaining the standard deviation assuming that a particle size distribution be a normal distribution.

(3) Method for Producing Quinacridone Pigment Fine-Particle as an Example of Organic Pigment Fine-Particle The method of the embodiments of the present invention for producing an organic pigment can widely be applied to the above-mentioned pigments. Specifically, the method of producing an unsubstituted or substituted quinacridone pigment is described as an example hereinafter. In the embodiments of the present invention, an unsubstituted or substituted quinacridone pigment represented by the following Formula (I) is produced in an apparatus having a channel for forming laminar flow.

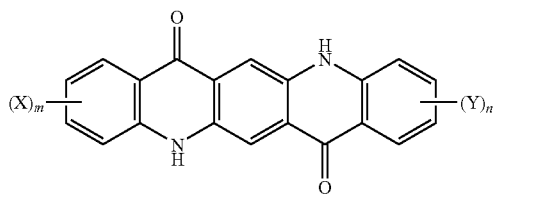

Formula (I)

First, the substituents in the Formula (I) are described. X and Y each independently represent a fluorine atom, a chlorine atom, an alkyl group having 1 to 3 carbon atoms, an alkoxy group having 1 to 3 carbon atoms, or a $COOR_a$ group (in which $R_a$ represents a hydrogen atom, or an alkyl group having 1 to 10 carbon atoms). Specifically, examples of the group represented by X and Y other than the fluorine atom, chlorine atom and carboxyl group, include an alkyl group, such as methyl, ethyl, propyl and isopropyl; an alkoxy group, such as methoxy, ethoxy, propyloxy and isopropoxy; and an alkoxycarbonyl group, such as methoxycarbonyl, ethoxycarbonyl, isopropoxycarbonyl and octyloxycarbonyl.

Preferably, X and Y each independently are a chlorine atom or an alkyl group, particularly preferably a methyl group.

The m and n each independently are 0, 1 or 2, particularly preferably 1.

Preferred specific examples of the quinacridone-series pigment to be synthesized, include an unsubstituted or substituted quinacridones, such as unsubstituted quinacridone, 2,9-dimethylquinacridone, and 4,11-dichloroquinacridone; and solid solutions thereof. When these are represented by C. I. numbers, the following are listed: Pigment Violet 19, Pigment Red 122, Pigment Red 207, Pigment Orange 48, Pigment Orange 49, Pigment Red 209, Pigment Red 206, Pigment Violet 42, and the like. However, the quinacridone-series pigment is not limited to these.

The production of the unsubstituted or substituted quinacridone pigment can be performed according to a usual synthesis process, preferably applying the process to the above-described apparatus or device having the channel with an equivalent diameter of 10 mm or less.

Examples of the solvent, which can be used in the embodiments of the present invention, include the above-mentioned organic solvent, dispersing agent, surfactant, or water, or the combination thereof. If necessary, for example, a water-soluble organic solvent which is added to an ink composition, and other components may be added to the solvent. As these solvent components, for example, constituents of pigment dispersing agents, as described in Japanese Patent Application Publication Nos. 2002-194263 and 2003-26972, can be used.

The reaction fluids may be fluids which are miscible with each other, or fluids which are immiscible with each other. Examples of the fluids miscible with each other include: solutions containing the same organic solvents; solutions containing organic solvents having relatively close natures; and a combination of a solution containing an organic solvent high in polarity, such as methanol, and water. Examples of the fluids immiscible with each other include a combination of a solution containing a solvent of low polarity, such as hexane, and a solution containing a solvent of high polarity, such as methanol.

In the case that a gas such as air or oxygen is used as an oxidizing agent, a method of dissolving the gas into the reaction fluid or introducing the gas into the channel can be taken. Preferably, the method of introducing the gas is taken.

The reaction temperature is preferably within the range in which the solvent is not solidified or vaporized, and it is preferably −20° C. to 250° C., more preferably 20° C. to 150° C. further preferably 40° C. to 120° C., and most preferably 60° C. to 100° C.

The flow velocity is advantageously 0.1 mL/hour to 300 L/hour, preferably 0.2 mL/hour to 30 L/hour, further preferably 0.5 mL/hour to 15 L/hour, and particularly preferably 1.0 mL/hour to 6 L/hour.

In the embodiments of the present invention, as the synthesis method of a quinacridone-series pigment which can be applied to a micro-reactor, various methods can be used, and any one of the processes can be applied. As the method of producing a quinacridone pigment according to the embodiments of the present invention, two reaction schemes are illustrated below as preferred examples. A quinacridone-series pigment can be produced in an apparatus having a channel whose equivalent diameter is preferably 10 mm or less, more preferably 1mm or less.

A method of synthesizing a quinacridone compound by oxidizing reaction of 6,13-dihydroquinacridone (the following Scheme 1) is preferably a method using air or oxygen (see processes described in Japanese Patent Application Publication Nos. 11-209641 and 2001-115052, as reaction examples for reference), or a method using hydrogen peroxide (see a process described in Japanese Patent Application Publication No. 2000-226530, as a reaction example for reference), from the viewpoint of load to the environment.

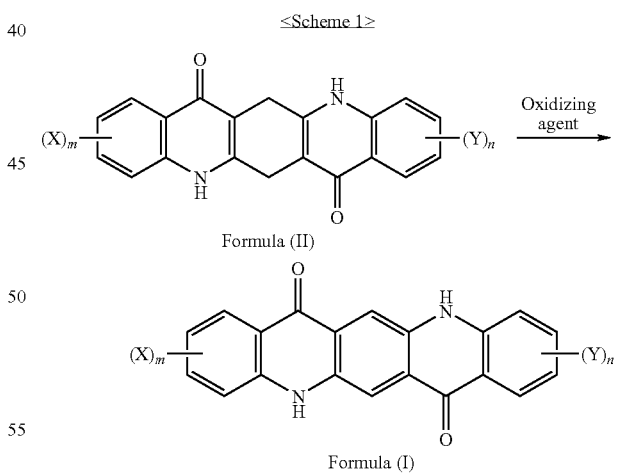

<Scheme 1>

Formula (II)

Formula (I)

In Scheme 1, X, Y, m and n have the same meanings as those described above.

A ring-closing reaction of a diarylaminoterephthalic acid or an ester thereof (the following Scheme 2) is carried out by use of an appropriate condensing agent (see methods described in Japanese Patent Application Publication Nos. 2001-335577 and 2000-103980, as reaction examples for reference).

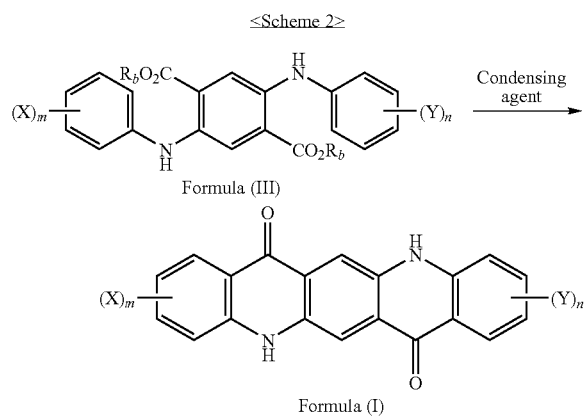

<Scheme 2>

Formula (III)

Formula (I)

In Scheme 2, X, Y, m and n have the same meanings as those described above. The substituent $R_b$ represents a hydrogen atom, or an alkyl, alkenyl, alkynyl or aryl group having 1 to 10 carbon atoms. Examples of the alkyl group include methyl, ethyl, propyl, and butyl groups. Examples of the alkenyl group include vinyl and allyl groups. Examples of the alkenyl group include an ethynyl group. Examples of the aryl group include a phenyl group. These substituents may further have a substituent. $R_b$ is preferably an aryl group, particularly preferably a phenyl group.

Examples of the solvent, which can be used in the production of the quinacridone-series pigment, include the organic solvent, dispersing agent, surfactant, or water, or the combination thereof. Specific examples thereof include ethers, such as tetrahydrofuran, dioxane, dimethoxyethane, and diglyme; esters, such as ethyl acetate, and butyl acetate; ketones, such as methyl ethyl ketone, 2-methyl-4-pentanone, and cyclohexanone; alcohols, such as ethanol, ethylene glycol, and diethylene glycol; nitriles, such as acetonitrile, and propionitrile; amide-series solvents, such as N,N-dimethylformamide, N,N-dimethylacetamide, N-methylpyrrolidone, and N,N-dimethylimidazolidone; and sulfur-containing solvents, such as dimethylsulfoxide, and sulfolane. Among these, amide-series solvents, dimethylsulfoxide, and sulfolane are preferable from the viewpoint of the solubility of the raw materials and products. If necessary, for example, a water-soluble organic solvent which is added to an ink composition, and other components may be added to the solvent. As these solvent components, for example, constituents of pigment dispersing agents, as described in Japanese Patent Application Publication Nos. 2002-194263 and 2003-26972, can be used. A desired ink is obtained by adding an appropriate additive(s) such as drying preventives (humectants), color-fading preventives, emulsion-stabilizing agents, penetrating accelerants, ultraviolet absorbents, preservatives, mold preventives, pH adjustive agents, surface tension adjustive agents, defoamants, viscosity adjustive agents, dispersants, dispersion-stabilizing agents, rust preventives, and chelating agents, to the ink composition.

The reaction fluids may be fluids which are miscible with each other, or fluids which are immiscible with each other. Examples of the fluids miscible with each other include: solutions containing the same organic solvents; solutions containing organic solvents having relatively close natures; and a combination of a solution containing an organic solvent high in polarity, such as methanol, and water. Examples of the fluids immiscible with each other include a combination of a solution containing a solvent of low polarity, such as hexane, and a solution containing a solvent of high polarity, such as methanol.

The quinacridone pigment obtained in the reaction is separated from the reaction solution by filtration or centrifugation, and then is sufficiently washed with an amide-series solvent, such as N,N-dimethylacetamide, thereby yielding the pigment with a high purity. Then, desired ink can be manufactured from the yielded quinacridone pigment fine particles.

The disazo-condensation-pigment can be similarly manufactured, and the detailed description thereof is omitted here.

EXAMPLES

The present invention will be described in more detail based on examples given below, but the present invention is not limited to these examples.

The pH values described in the following examples and comparative examples were measured with a glass electrode-type hydrogen ion concentration meter, HM-40V (trade name, measuring range: pH of 0 to 14) manufactured by TOA Electronics, Ltd. The particle diameter distributions were measured with a Microtrac UPA 150 (trade name) manufactured by Nikkiso Co., Ltd. For TEM measurement, a transmission electron microscopy JEM-2000FX (trade name) manufactured by JEOL, Ltd. was used.

Example 1

At room temperature, 1.5 g of 2,9-dimethylquinacridone was dissolved into 13.5 g of dimethylsulfoxide, 2.68 mL of a 5 mol/L aqueous sodium hydroxide solution, and 0.75 g of a dispersing agent, polyvinyl pyrrolidone (K30 (trade name), manufactured by Wako Pure Chemicals Industries, Ltd.). The resultant solution is designated to IA solution. The pH of the IA solution was over a measurable limit (pH: 14), and was unable to be measured. Separately, 0.75 g of a dispersing agent, sodium N-oleoyl-N-methyltaurine was mixed with 90 mL of distilled water. The resultant solution is designated to as IIA solution. The pH of the IIA solution was 7.70. These solutions each were passed through a micro-filter having pores of 0.45 µm diameter (manufactured by Fuji Photo Film Co., Ltd.), to remove impurities such as dust. Then, using a reactor, as illustrated in FIG. 14A, reaction was conducted according to the following procedure. Two PTFE (polytetrafluoroethylene) tubes with length 50 cm and equivalent diameter 1 mm were connected to two inlets of a PTFE Y-shaped connector with equivalent diameter 500 µm, each through a connector. Two syringes in which the IA solution or the IIA solution was put, respectively, were separately connected to the front tips of the two tubes, and the reactor was fitted to a pump. A PTFE tube with length 1 m and equivalent diameter 500 µm was connected to the outlet of the connector. The IA solution and the IIA solution were fed out at flow velocities of 1 mL/hour and 6 mL/hour, respectively. The inside of the channel was a laminar flow (Reynolds number: about 5.0), and a dispersion of 2,9-dimethylquinacridone was obtained. This dispersion was collected from the front tip of the tube, and is designated to as Sample I according to the embodiments of the present invention. The pH of the Sample 1 was 13.06. The mode diameter thereof was 120 nm, and the arithmetic standard deviation thereof was 58 nm.

Comparative Example 1

Separately, the IA solution was added to 6 mL of the IIA solution in a beaker, at room temperature, while stirring with a stirrer, to yield a dispersion of 2,9-dimethylquinacridone. This is designated to as Comparative sample 1. The particle diameters and the particle diameter distributions of the particles in the thus-obtained dispersions of the Sample 1 and the Comparative sample 1, were compared with each other, by use of the dynamic light scattering particle diameter measuring device. As a result, it was confirmed that the particle diameter and the particle diameter (size) distribution range of the particles in the dispersion of the Sample 1 were much smaller than those of the particles in the Comparative sample 1, which had a mode diameter of 144 nm and an arithmetic standard deviation of 77 nm.

Example 2

At room temperature, 0.15 g of 2,9-dimethylquinacridone was dissolved into 13.35 mL of dimethylsulfoxide, 1.65 mL of a 0.8 mol/L aqueous potassium hydroxide solution, and 0.75 g of polyvinyl pyrrolidone (K30, manufactured by Wako Pure Chemicals Industries, Ltd.). The resultant solution is designated to IB solution. The pH of the IB solution was over a measurable limit, and was unable to be measured. This IB solution and the IIA solution prepared in Example 1 were separately passed through a micro-filter having pores of 0.45 μm diameter (manufactured by Fuji Photo Film Co., Ltd.), to remove impurities such as dust, thereby yielding transparent solutions, respectively. Then, using a reactor described below, reaction was conducted according to the following procedure. Two PTFE tubes with length 50 cm and equivalent diameter 1 mm were connected to two inlets of a PTFE Y-shaped connector with equivalent diameter 500 μm, each through a connector. Two syringes in which the IB solution or the IIA solution was put, respectively, were separately connected to the front tips of the two tubes, and the reactor was fitted to a pump. A PTFE tube with length 1 m and equivalent diameter 500 μm was connected to the outlet of the connector. The IB solution and the IIA solution were fed out at flow velocities of 1.0 mL/hour and 30.0 mL/hour, respectively. The inside of the channel was a laminar flow (Reynolds number: about 21.9), and a dispersion of 2,9-dimethylquinacridone was obtained. This dispersion was collected from the front tip of the tube, and is designated to as Sample 2 according to the embodiments of the present invention. The pH of the Sample 2 was 10.49. This was measured by use of the dynamic light scattering particle diameter measuring device. As a result, the mode diameter of the particles in the dispersion was 51 nm, and the arithmetic standard deviation was 28 nm. Thus, it was confirmed that the distribution range of the dispersion particles was very narrow. Further, observation of the dispersion with the transmission electron microscope (TEM) showed that the particles had roundish particle shape.

Comparative Example 2

Separately, 0.5 mL of the IB solution was added to 3.0 mL of the IIA solution in a beaker, at room temperature, while stirring with a stirrer, to yield a dispersion of 2,9-dimethylquinacridone. This is designated to as Comparative sample 2. The pH of the Comparative sample 2 was 11.81. This was measured by use of the dynamic light scattering particle diameter measuring device. As a result, the mode diameter was 93 nm, and the arithmetic standard deviation was 57 nm. Thus, both of the particle diameter and the distribution range were conspicuously large. Further, observation of the dispersion with the transmission electron microscope (TEM) showed that the particles were in the form of needle.

Comparative Example 3

A dispersion was obtained in the same manner as in Example 2, except that all of the equivalent diameters of the PTFE tubes and the PTFE Y-shaped connector that were used in the reactor in Example 2 were set to 20 mm, and that the IB solution and the IIA solution were fed out at feeding flow velocities of 26.49 L/hr and 122.4 L/hr, respectively. The flow inside the channel (Reynolds number: about 2639.6) was unstable. This is designated to as Comparative sample 3. The pH of the Comparative sample 3 was 12.56. This was measured by use of the dynamic light scattering particle diameter measuring device. As a result, the mode diameter was 277 nm, and the arithmetic standard deviation was 140 nm. Thus, it was confirmed that the particle diameter was conspicuously large and the distribution range was conspicuously wide.

The comparison of the Sample 2 according to the embodiments of the present invention with the Comparative sample 2 showed that by preparing pigment particles in the channel, the mode diameter of the particles and the distribution range thereof were made quite small and narrow, and the particle diameters thereof were made uniform. The comparison of the Sample 2 according to the embodiments of the present invention with the Comparative sample 3 showed that the mode diameter of the particles was made quite small and the distribution range was made considerably narrow when the equivalent diameter of the channel was 10 mm or less, in particular, in a micro-scale.

Example 3

At room temperature, 0.01 g of 2,9-dimethylquinacridone was dissolved into 10.0 mL of dimethylsulfoxide, 0.11 mL of a 0.8N aqueous potassium hydroxide solution, and 0.05 g of polyvinyl pyrrolidone (K30, manufactured by Wako Pure Chemicals Industries, Ltd.). The. resultant solution is designated to IC solution. The pH of the IC solution was over a measurable limit, and was unable to be measured. The IC solution was passed through a micro-filter having pores of 0.45 μm diameter (manufactured by Fuji Photo Film Co., Ltd.), to remove impurities such as dust, thereby yielding a transparent solution. In the reactor, as illustrated in FIG. 14A, which had a Y-shaped channel made of glass and had a channel width A of 100 μm, a channel width B of 100 μm, a channel width C of 100 μm, a channel length F of 12 cm, and a channel depth H of 40 μm, two PTFE tubes were connected to the introducing port 1011 and the introducing port 1012, each through a connector. Then, two syringes in which the IC solution or distilled water was put, respectively, were separately connected to the front tips of the two tubes, and the reactor was fitted to a pump.

A PTFE tube was connected to the discharge port 1014 also through a connector. The IC solution and the distilled water were fed out at flow velocities of 20 μL/min and 20 μL/min, respectively. The inside of the channel was a laminar flow (Reynolds number: about 8.5), and a dispersion of 2,9-dimethylquinacridone was obtained. This was collected from the front tip of the tube. The pH of the thus-obtained dispersion was 13.93. This was measured by use of the dynamic light scattering particle diameter measuring device. As a result, the mode diameter of the particles in the dispersion was 50 nm.

Example 4

Using the reactor, as illustrated in FIG. 1 SA, which had a cylindrical channel having a channel diameter D of 200 μm, a channel diameter E of 620 μm, and a channel length G of 10 cm, two PTFE tubes were connected to the introducing port 1021 and the introducing port 1022, each through a connector. Then, two syringes in which the IB solution or the IIA solution, as prepared in Examples 1 and 2, was put, respectively, were separately connected to the front tips of the tubes, and the reactor was fitted to a pump. The IB solution and the IIA solution were fed out at flow velocities of 1.0 mL/hour and 30.0 mL/hour, respectively. The inside of the channel was a laminar flow (Reynolds number: about 17.7), and a dispersion of 2,9-dimethylquinacridone was obtained. This was collected from the discharge port 1024. The pH of the dispersion was 10.44. This was measured by use of the dynamic light scattering particle diameter measuring device. As a result, the mode diameter of the particles in the dispersion was 94 nm, and the arithmetic standard deviation was 77 nm. Thus, it was confirmed that the distribution range thereof was very narrow.

Reference Example 1

At room temperature, 0.01 g of 2,9-dimethylquinacridone was added to 10 mL of dimethylsulfoxide, 0.04 mL of a 0.8 mol/L aqueous potassium hydroxide solution, and 0.05 g of polyvinyl pyrrolidone (K30, manufactured by Wako Pure Chemicals Industries, Ltd.). The resultant liquid is designated to ID liquid. The pH of the ID liquid was 12.74. The ID liquid was suspended, but the ID liquid was used as it was, without passing through a micro-filter having pores of 0.45 μm diameter (manufactured by Fuji Photo Film Co., Ltd.). In the reactor, as illustrated in FIG. 14A, which had a Y-shaped channel made of glass and had a channel width A of 100 μm, a channel width B of 100 μm, a channel width C of 100 μm, a channel length F of 12 cm, and a channel depth H of 40 μm, two PTFE tubes were connected to the introducing port 1011 and the introducing port 1012, each through a connector. Then, two syringes in which the ID liquid or the IIA solution as prepared in Example 1 was put, respectively, were separately connected to the front tips of the tubes, and the reactor was fitted to a pump. A PTFE tube was connected to the discharge port 1014 also through a connector. The ID liquid and the IIA solution were fed out at flow velocities of 20 μL/min and 20 μL/min, respectively. As a result, at the confluent position where the ID liquid and the IIA solution were combined together, the channel was blocked. It is understood from this fact that in the method of the embodiments of the present invention using a reactor having a Y-shaped channel, it is important to use a homogenous solution in which the pigment is dissolved.

Reference Example 2

In the reactor, as illustrated in FIG. 15A, which had a cylindrical channel having a channel diameter D of 200 μm, a channel diameter E of 620 μm, and a channel length G of 10 cm, two PTFE tubes were connected to the introducing port 1021 and the introducing port 1022, each through a connector. Then, two syringes in which the ID liquid as prepared in Reference example 1 or the IIA solution as prepared in Example 1 was put, respectively, were separately connected to the front tips of the tubes, and the reactor was fitted to a pump. The ID liquid and the IIA solution were fed out at feeding flow velocities of 1.0 mL/hour and 30.0 mL/hour, respectively. As a result, at the confluent position where the ID liquid and the IIA solution were combined, the channel was gradually blocked. It is understood from this fact that in the method of the embodiments of the present invention using a reactor having a cylindrical channel also, it is important to use a homogenous solution in which the pigment is dissolved.

Example 5

In the reactor capable of separating flows to its discharge ports, as illustrated in FIG. 16A, which had a Y-shaped channel having a channel width I of 100 μm, a channel width J of 100 μm, a channel width K of 100 μm, a channel width L of 100 μm, a channel width M of 100 μm, a channel length Q of 2 cm, and a channel depth S of 40 μm, two PTFE tubes were connected to the introducing port 1031 and the introducing port 1032, each through a connector. Then, two syringes in which the IB solution prepared in Example 3 or the IIA solution prepared in Example 1 was put, respectively, were separately connected to the front tips of the tubes, and the reactor was fitted to a pump. PTFE tubes were connected through connectors to the discharge ports 1034 and 1035 also. The IB solution was fed out at a feeding flow velocity of 10 μL/min through an introducing channel 1033a, and the IIA solution was fed out at a feeding flow velocity of 60 μL/min through an introducing channel 1033b, respectively, to yield a dispersion layer of 2,9-dimethylquinacridone as laminar flow (Reynolds number: about 14.9) in a reaction channel 1033c. In FIG. 16A, 1033d is a confluent point of the flows. At a fluid separating point 1033e, the dispersion layer and the other solution layer were able to be separated such that the dispersion layer would be led to the discharge port 1034 through a discharging channel 1033f and that the other solution layer would be led to the discharge port 1035 through a discharging channel 1033g. This process made it possible to obtain the dispersion having a high concentration. The pH of the sample obtained from the discharge port 1034 was 12.46, and the pH of the sample obtained from the discharge port 1035 was 11.74.

Example 6

In the reactor capable of separating flows to its discharge ports, as illustrated in FIG. 17, which had a cylindrical channel having a channel diameter N of 100 μm, a channel diameter P of 300 μm, a channel diameter O of 100 μm, and a channel length R of 5 cm, two PTFE tubes were connected to the introducing port 1041 and the introducing port 1042, each through a connector. Then, two syringes in which the IC solution prepared in Example 3 or the IIA solution prepared in Example 1 was put, respectively, were separately connected to the front tips of the tubes and the reactor was fitted to a pump. PTFE tubes were connected through connectors to the discharge ports 1044 and 1045 also. The ID solution was fed out at a feeding flow velocity of 10 μL/min through an introducing channel 1043b, and the IIA solution was fed out at a feeding flow velocity of 30 μL/min through an introducing channel 1043a, respectively, to yield a dispersion of 2,9-dimethylquinacridone as cylindrical laminar flow (Reynolds number: about 2.83) in a reaction channel 1043c. In FIG. 17, 1043d is a confluent point of the flows. At a fluid separating point 1043e, the cylindrical laminar flow containing the dispersion were able to be separated from the other solution such that the cylindrical laminar flow would be led to the discharge port 1045 through a discharging channel 1043f and that the other solution would be led to the discharge port 1044 through a discharging channel 1043g. This process made it possible to yield the dispersion having a high concentration even if the cylindrical tube micro-reactor was used.

Comparative Example 4

A IE solution was obtained, by removing polyvinyl pyrrolidone (K30, manufactured by Wako Pure Chemicals Industries, Ltd.) and sodium N-oleoyl-N-methyltaurine from the IB solution in Example 2. The experiment was carried in the same manner as in Example 2, except that the IE solution instead of the IB solution, and the distilled water were fed at flow velocities of 1.0 mL/hr and 6.0 mL/hr, respectively, without changing the PTFE Y-shaped connector, the PTFE tubes and other members in the reactor utilized in Example 2. The thus-obtained dispersion was measured by use of the dynamic light scattering particle diameter measuring device. As a result, the mode diameter of the particles in the dispersion was 2.80 μm, and the arithmetic standard deviation was 0.89 μm. Thus, both of the particle diameter and the arithmetic standard deviation were very large. These results demonstrate that a dispersing agent is preferable in the embodiments of the present invention, to obtain fine particles of nanometer size.

Example 7

At room temperature, 1.0 g of Pigment Yellow 93 was dissolved into 10.0 g of dimethylsulfoxide, 1.3 mL of a 5 mol/L aqueous sodium hydroxide solution, and 0.5 g of a dispersing agent, polyvinyl pyrrolidone (K30, manufactured by Wako Pure Chemicals Industries, Ltd.). The resultant solution is designated to IF solution. Separately, 0.5 g of a dispersing agent, sodium N-oleoyl-N-methyltaurine was mixed with 60 mL of distilled water. The resultant solution is designated to as IIB solution. These solutions were separately passed through a micro-filter having pores of 0.45 μm diameter (manufactured by Fuji Photo Film Co., Ltd.), to remove impurities such as dust. Then, using a reactor described below, reaction was conducted according to the following procedure. Two PTFE tubes with length 50 cm and equivalent diameter 1 mm were connected to two inlets of a PTFE Y-shaped connector with equivalent diameter 500 μm, each through a connector. Two syringes in which the IF solution or the IIB solution was put, respectively, were separately connected to the front tips of the tubes, and the reactor was fitted to a pump. A PTFE tube with length 1 m and equivalent diameter 500 μm was connected to the outlet through a connector. The IF solution and the IIB solution were fed out at flow velocities of 1 mL/hr and 6 mL/hr, respectively, to obtain a dispersion layer of Pigment Yellow 93 as laminar flow (Reynolds number: about 4.9) inside the channel. This was collected from the front tip of the tube, and is designated to as Sample 3 according to the embodiments of the present invention. In this case, the mode diameter was 133 nm, and the arithmetic standard deviation was 69 nm.

Comparative Example 5

Separately, the IF solution was added to 6 mL of the IIB solution, at room temperature, while stirring with a stirrer, to yield a dispersion of Pigment Yellow 93. This is designated to as Comparative sample 4.

The pigment particle diameters of the Sample 3 and the Comparative sample 4 were compared with each other, by use of the dynamic light scattering particle diameter measuring device. As a result, it was confirmed that the particle diameter and the particle diameter distribution range of the particles in the dispersion of the Sample 3 were much smaller than those of the Comparative sample 4, which had a mode diameter of 189 nm and an arithmetic standard deviation of 98 nm.

Example 8

A pigment dispersion was obtained in the same manner as in Example 4, except that 2,9-dimethylquinacridone in the IB solution was changed to an equimolar amount of Pigment Yellow 93. The observation of the thus-obtained dispersion with the transmission electron microscope (TEM) showed that the particles in the dispersion had roundish particle shapes having an average particle diameter of 12 nm in terms of primary particles.

Example 9

A pigment dispersion was obtained in the same manner as in Example 4, except that 2,9-dimethylquinacridone in the IB solution was changed to an equimolar amount of Pigment Red 254. The observation of the thus-obtained dispersion with the transmission electron microscope (TEM) showed that the particles in the dispersion also had roundish particle shapes having an average particle diameter of 9 nm in terms of primary particles.

Example 10

At room temperature, 1.2 g of Pigment Blue 15 (manufactured by Tokyo Kasei Kogyo Co., Ltd.) was dissolved into 10 mL of 95% sulfuric acid, to prepare a IG solution. Separately, 6.0 g of polyvinyl pyrrolidone (K30, manufactured by Wako Pure Chemicals Industries, Ltd.), 6.0 g of sodium N-oleoyl-N-methyltaurine, and 240 mL of distilled water were mixed, to prepare a IIC solution. These solutions were separately passed through a micro-filter having pores of 0.45 μm diameter to remove impurities such as dust, to yield transparent solutions, respectively. A dispersion was prepared in the same manner as in Example 4, except that the IB solution used in Example 4 was changed to the IG solution, and that the IIA solution was changed to the IIC solution. The observation of the thus-obtained dispersion with the transmission electron microscope (TEM) showed that the particles in the dispersion had roundish particle shapes having an average particle diameter of 15 nm in terms of primary particles.

Example 11

Synthesis of 2,9-dimethylquinacridone by Oxidization Reaction

To 2.0 g of 2,9-dimethyl-6,13-dihydroquinacridone, were added 10.0 mL of a 5 mol/L aqueous sodium hydroxide solution, and 18 g of polyethylene glycol 400, and the resultant mixture was stirred at room temperature. The resultant solution, the color of which was deep green, is referred to as Solution A. The Solution A was fed at a flow velocity of 3.0 mL/hr by use of a syringe pump. Separately, as Solution B, a 30 wt % aqueous hydrogen peroxide solution was fed at a flow velocity of 0.5 mL/hr, by use of a syringe pump. These Solutions A and B were fed to a micro-mixer (channel width, 45 μm; depth, 200 μm) manufactured by IMM Co., and then mixed in a micro-space therein. At the discharge port of the micro-mixer, the production of a dispersion having a vivid magenta color was observed. The dispersion was analyzed, and it was proved that 2,9-dimethylquinacridone having a purity of 96% or more was produced.

Comparative Example 6

To 2.0 g of 2,9-dimethyl-6,13-dihydroquinacridone, were added 10.0 mL of a 5N aqueous sodium hydroxide solution, and 18 g of polyethylene glycol 400, and the resultant mixture was stirred at room temperature. To the resultant solution, the color of which was deep green, was dropwise added 2.0 mL of a 30 wt % aqueous hydrogen peroxide solution, and then the resultant solution was stirred at 60° C. for 1 hour, and cooled to room temperature. The resultant was analyzed, and it was proved that the conversion ratio of the starting material was 80%, and that 2,9-dimethylquinacridone having a pigment purity of 94% or more was produced.

Example 12

Synthesis of 2,9-dimethylquinacridone by Dehydration Condensation

A solution was prepared by mixing 2.0 g of 2,5-di-(p-toluidino)-terephthalic acid, 0.1 g of p-toluenesulfonic acid, 15 mL of ethylene glycol, and 20 mL of dimethylformamide. A fused silica glass capillary (equivalent diameter, 0.20 mm; and length, 4.0 m) was provided as a reactor, and was fixed in such a manner that a portion of 2.5 m length out of the whole capillary was immersed in an oil bath. The oil bath was heated to 150° C., and this solution was fed into the reactor at a flow velocity of 1.1 mL/hr (retention time: 5 minutes) with a syringe pump. A pigment having a vivid magenta color was obtained from the discharge port of the capillary.

Comparative Example 7

A solution was prepared by mixing 2.0 g of 2,5-di-(p-toluidino)-terephthalic acid, 0.1 g of p-toluenesulfonic acid, 15 mL of ethylene glycol, and 20 mL of dimethylformamide. An oil bath was heated to 150° C. to heat the solution in a 50 mL flask. The solution was stirred for 30 minutes. The thus-produced pigment was analyzed, and it was proved that the starting materials remained slightly.

Example 13

Production of C.I. Pigment Yellow 93 by Amidation Reaction

Into 20 mL of dimethylformamide, were dissolved 0.3 g of the phenyl ester derivative (A) and 0.1 g of 3-chloro-2-methylanilin. A fused silica glass capillary (equivalent diameter, 0.53 mm; and length, 1.5 m) was provided as a micro-reactor, and was fixed in such a manner that a portion of 1.0 m length out of the whole capillary was immersed in an oil bath. The oil bath was heated to 150° C., and this solution was fed into the reactor at a flow velocity of 2.2 mL/hour (retention time: 6 minutes), with a syringe pump. A pigment came out from the discharge port of the capillary, had a vivid yellow color. The pigment was analyzed, and it was proved that the purity thereof was 95% or more.

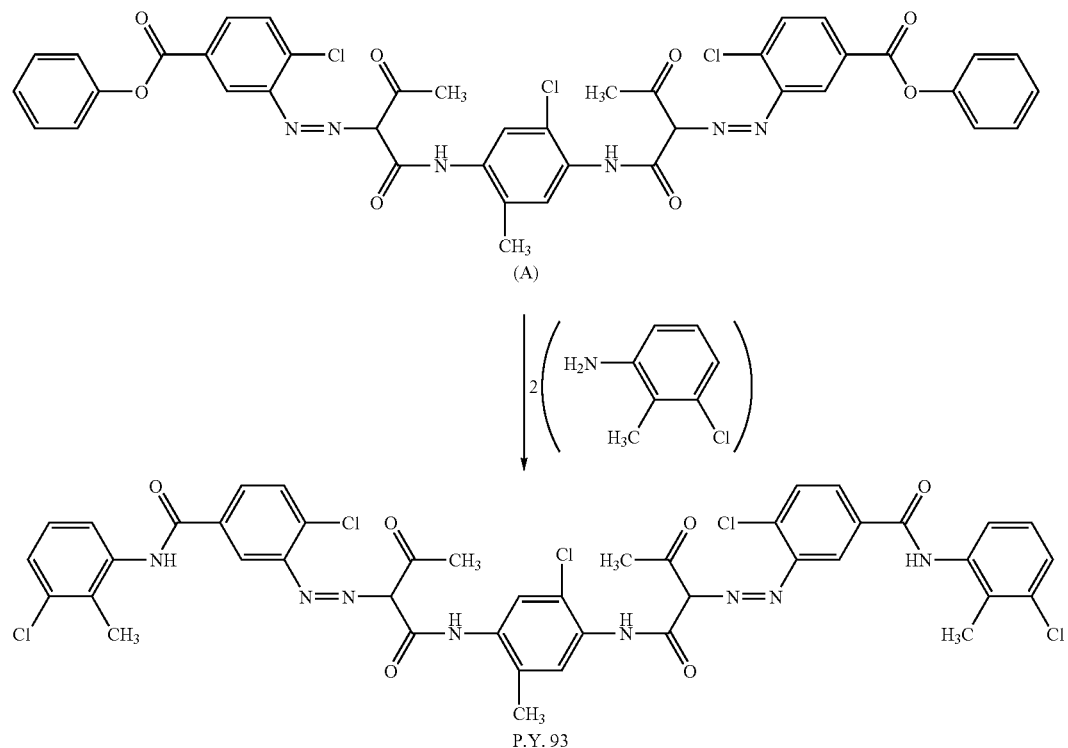

Comparative Example 8

Into 20 mL of dimethylformamide, were dissolved 0.3 g of the phenyl ester derivative (A) and 0.1 g of 3-chloro-2-methylaniline. An oil bath was heated to 150° C. to heat this solution in a 50 mL flask. The solution was stirred for 1 hour. The thus-produced pigment was analyzed, and it was proved that the conversion ratio was 65%, and that the pigment had a pigment purity of 93% or less, and had a slightly dim (darkened) yellow.

Example 14

Production of C.I. Pigment Red 214 by Amidation Reaction

Into 50 mL of dimethylsulfoxide, were dissolved 1.0 g of the phenyl ester derivative (B) and 0.2 g of 2,5-dichloro-1,4-phenylenediamine. A fused silica glass capillary (equivalent diameter, 0.53 mm; length, 1.5 m) was provided as a microreactor, and was fixed in such a manner that a portion of 1.0 m length out of the whole capillary was immersed in an oil bath. The oil bath was heated to 150° C., and this solution was fed into the reactor at a flow velocity of 3.3 mL/hour (retention time: 4 minutes), with a syringe pump. A pigment came out from the discharge port of the capillary, had a vivid red color. The pigment was analyzed, and it was proved that the purity thereof was 96% or more.

Industries, Ltd., average molecular weight of 360,000) in DMSO, was filtrated with a micro-filter (manufactured by Advantec Co., Ltd.), made of PTFE and having pores of 0.5 μm diameters. The resultant filtrate is called a IH solution. Further, a colorless transparent solution prepared into 50 mL by dissolving 0.5 g (1. 17 mmol) of a sodium salt of N-oleoyl-N-methyltaurine in distilled water, was filtrated with a microfilter for aqueous solvent (manufactured by Sartorius Co.), made of a cellulose ester and having pores of 0.45 μm. The resultant filtrate is called an IID solution.

A jacket capable of circulating a coolant was fitted to a reactor having a cylindrical channel and having a channel diameter D of 100 μm, a channel diameter E of 400 μm and a channel length G of 20 cm, as illustrated in FIG. 15A, so that the portion along the channel length G would be cooled to 5° C. Two PTFE tubes were connected to the introducing ports 1021 and 1022, each through a connector.

A syringe in which a mixed solution of the IG solution and the IH solution at a ratio by volume of IG:IH of 1:2 was put, was connected to the introducing port 1021, and the syringe was set to a syringe pump. A syringe in which the IID was put, was connected to the introducing port 1022, and the syringe

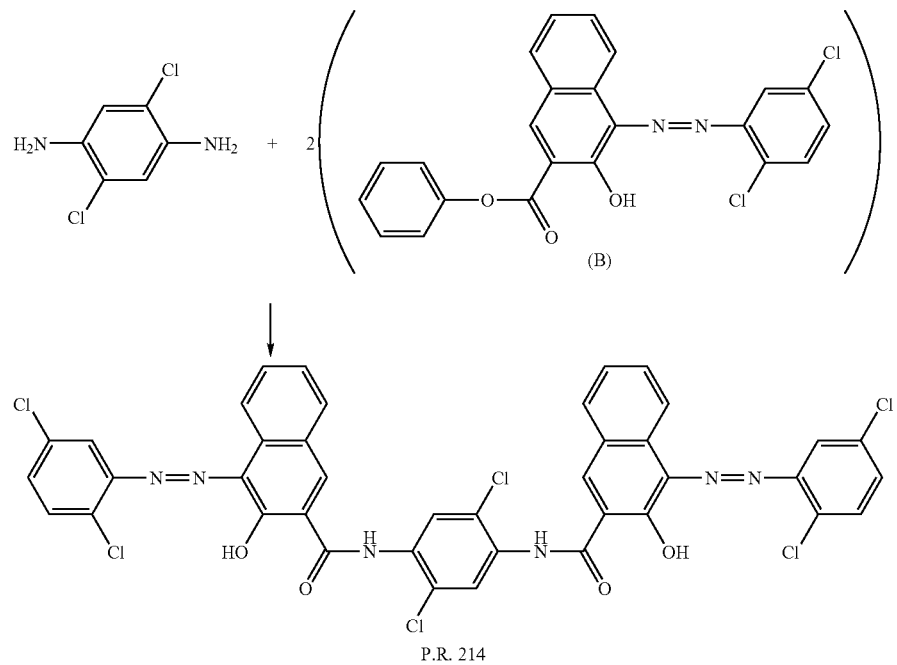

Example 15

Synthesis of Fine Particles of a Phthalocyanine Pigment (Pigment Blue 16)

A dark green solution prepared into 50 mL by dissolving 2.5 g (0.45 mL) of a disodium salt of phthalocyanine (manufactured by Tokyo Kasei Kogyo Co., Ltd.) in dimethylsulfoxide (DMSO), was filtrated with a micro-filter (manufactured by Advantec Co., Ltd.), made of PTFE and having pores of 0.5 μm diameters. The resultant filtrate is called a IG solution. Then, a colorless transparent solution prepared into 50 mL by dissolving 0.5 g of polyvinyl pyrrolidone (PVP, K-90 (trade name), manufactured by Wako Pure Chemicals was set to a syringe pump. The solutions were sent out at solution-sending speeds of 1.0 mL/hr and 10.0 mL/hr from the introducing portions 1021 and 1022, respectively. As a result, the flow in the channel cooled to 5° C. became a laminar flow (Reynolds number: about 9.8), and a dispersion of phthalocyanine was yielded. This dispersion was then collected from a discharge port 1024. This was measured by use of a dynamic light scattering particle diameter measuring device. As a result, the mode diameter of the particles in the dispersion was 17.4 nm, and the arithmetic standard deviation thereof was 8.6 nm. Thus, the resultant dispersion had a quite small particle diameter and a very narrow distribution width.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An inkjet recording apparatus, comprising:
a recording head including nozzles which discharge droplets of ink onto a recording medium for printing, the ink containing fine particles of an organic pigment manufactured by the steps of: flowing a solution of an organic pigment dissolved in an alkaline or acidic aqueous medium through a channel which provides a laminar flow; and changing a hydrogen ion exponent (pH) of the solution in a course of the laminar flow;
a computing device which computes a non-operational time period for one of the nozzles;
a calculating device which calculates a predicted non-operational time period until a next operation of the one of the nozzles; and
a preliminary discharge control device which performs control whereby preliminary discharge of the one of the nozzles is carried out if a total of the non-operational time period and the predicted non-operational time period exceeds a reference time period.

2. The inkjet recording apparatus as defined in claim 1, wherein the reference time period is a time period until discharge abnormality in the droplets of the ink discharged from the nozzles occurs.

3. The inkjet recording apparatus as defined in claim 1, wherein the reference time period is determined in accordance with at least one of a type of the ink and use environmental conditions of the recording head.

4. The inkjet recording apparatus as defined in claim 1, wherein the solution of the organic pigment contains at least one dispersing agent.

5. The inkjet recording apparatus as defined in claim 1, wherein the fine particles of the organic pigment have a mode diameter of 1 μm or less.

6. The inkjet recording apparatus as defined in claim 1, wherein:
the solution of the organic pigment is alkaline; and
the organic pigment is a quinacridone-series pigment represented by the following Formula (I):

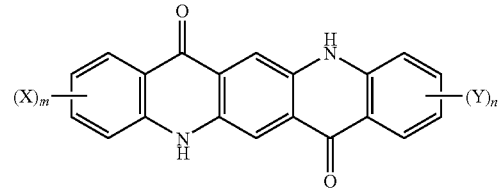

Formula (I)

where X and Y each independently represent a fluorine atom, a chlorine atom, an alkyl group having 1 to 3 carbon atoms, an alkoxy group having 1 to 3 carbon atoms, or a $COOR_a$ group in which $R_a$ represents a hydrogen atom, or an alkyl group having 1 to 10 carbon atoms; and m and n each independently are 0, 1 or 2.

7. The inkjet recording apparatus as defined in claim 1, wherein:
the ink ejected from the recording head is alkaline; and
at least a part of the recording head to be in contact with the ink is made of an alkaline-resistant material.

* * * * *